(12) United States Patent
Wang et al.

(10) Patent No.: US 12,106,768 B2
(45) Date of Patent: Oct. 1, 2024

(54) SPEECH SIGNAL PROCESSING METHOD AND SPEECH SEPARATION METHOD

(71) Applicant: Tencent Technology (Shenzhen) Company Limited, Shenzhen (CN)

(72) Inventors: Jun Wang, Shenzhen (CN); Wingyip Lam, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 361 days.

(21) Appl. No.: 17/674,677

(22) Filed: Feb. 17, 2022

(65) Prior Publication Data

US 2022/0172737 A1 Jun. 2, 2022

Related U.S. Application Data

(63) Continuation of application No. PCT/CN2020/126475, filed on Nov. 4, 2020.

(30) Foreign Application Priority Data

Jan. 2, 2020 (CN) .......................... 202010003201.2

(51) Int. Cl.
*G10L 25/30* (2013.01)
*G10L 25/51* (2013.01)

(52) U.S. Cl.
CPC .............. *G10L 25/51* (2013.01); *G10L 25/30* (2013.01)

(58) Field of Classification Search
CPC ................................ G10L 25/51; G10L 25/30
(Continued)

(56) References Cited

U.S. PATENT DOCUMENTS 6,832,194 B1 12/2004 Mozer et al.
10,147,442 B1 12/2018 Panchapagesan et al.
(Continued)

FOREIGN PATENT DOCUMENTS

CN 108615533 A 10/2018
CN 108962229 A 12/2018
(Continued)

OTHER PUBLICATIONS

S. Watanabe, T. Hori, J. Le Roux and J. R. Hershey, "Student-teacher network learning with enhanced features," 2017 IEEE International Conference on Acoustics, Speech and Signal Processing (ICASSP), New Orleans, LA, USA, 2017, pp. 5275-5279, doi : 10.1109/ICASSP.2017.7953163. keywords: {Speech enhance (Year: 2017).*

(Continued)

*Primary Examiner* — Bharatkumar S Shah
(74) *Attorney, Agent, or Firm* — Morgan, Lewis & Bockius LLP

(57) ABSTRACT

This application provides a speech signal processing method performed by a computer device. Through an iterative training process, a teacher speech separation model can play a smooth role in the training of a student speech separation model based on the accuracy of separation results of the student speech separation model of outputting a target speech signal from a mixed speech signal and the consistency between separation results obtained by the teacher speech separation model of outputting the target speech signal from the mixed speech signal and the student speech separation model of performing the same task, thereby maintaining the separation stability while improving the separation accuracy of the student speech separation model as a trained speech separation model, and greatly improving (Continued)

the separation capability of the trained speech separation model.

18 Claims, 6 Drawing Sheets

(58) Field of Classification Search
USPC ........................................................ 704/200
See application file for complete search history.

(56) References Cited

U.S. PATENT DOCUMENTS

| | | | |
|---|---|---|---|
| 2004/0199384 A1 | 10/2004 | Hong | |
| 2011/0313953 A1 | 12/2011 | Lane et al. | |
| 2019/0205748 A1* | 7/2019 | Fukuda | G06N 3/044 |
| 2020/0357384 A1* | 11/2020 | Kim | G10L 15/183 |

FOREIGN PATENT DOCUMENTS

| | | |
|---|---|---|
| CN | 110390950 A | 10/2019 |
| CN | 110459240 A | 11/2019 |
| CN | 110600017 A | 12/2019 |
| CN | 111179962 A | 5/2020 |
| CN | 111341341 A | 6/2020 |

OTHER PUBLICATIONS

Extended European Search Report, EP20908929.1, Aug. 5, 2022, 9 pgs.
Max W.Y. Lam et al., "Mixup-Breakdown: A Consistency Training Method for Improving Generalization of Speech Separation Models", Tencent AI Lab, arxiv.org, Cornell University Library, Oct. 28, 2019, XP081522560, 5 pgs.
Tencent Technology, WO, PCT/CN2020/126475, Jan. 28, 2021, 5 pgs.
Tencent Technology, IPRP, PCT/CN2020/126475, Jul. 5, 2022, 6 pgs.
Vikas Verma et al., "Interpolation Consistency Training for Semi-Supervised Learning", arxiv.org, Cornell University Library, Mar. 9, 2019, XP081131463, 10 pgs.
Xiang Hao et al., "SNR-Based Teachers-Student Technique for Speech Enhancement", Inner Mongolia Key Laboratory of Mongolian Information Processing Technology, College of Computer Science, Inner Mongolia University, Oct. 29, 2020, XP081802231, 6 pgs.
Tencent Technology, ISR, PCT/CN2020/126475, Jan. 28, 2021, 2 pgs.

* cited by examiner

//SPEECH SIGNAL PROCESSING METHOD AND SPEECH SEPARATION METHOD

CROSS-REFERENCE TO RELATED APPLICATIONS

This application is a continuation application of PCT Patent Application No. PCT/CN2020/126475, entitled "VOICE SIGNAL PROCESSING METHOD AND SPEECH SEPARATION METHOD" filed on Nov. 4, 2020, which claims priority to Chinese Patent Application No. 202010003201.2, filed with the State Intellectual Property Office of the People's Republic of China on Jan. 2, 2020, and entitled "SPEECH SEPARATION MODEL TRAINING METHOD, AND SPEECH SEPARATION METHOD AND APPARATUS", all of which are incorporated herein by reference in their entirety.

FIELD OF THE TECHNOLOGY

This application relates to the field of speech technologies, and in particular, to a speech signal processing method, a speech separation method and apparatus, a computer device, and a storage medium.

BACKGROUND OF THE DISCLOSURE

With the development of artificial intelligence (AI) technologies and electronic devices, speech has become one of the important ways for humans to interact with electronic devices. However, due to the existence of interfering sound sources, the recognition accuracy of speech recognition of electronic devices in a complex and open environment is far from satisfactory. The reason is that it is difficult to accurately separate the target speech from the interfering sound sources. At this stage, it is still a challenging task to develop a speech separation method with relatively strong generalization and robustness in a complex and variable input environment.

SUMMARY

Embodiments of this application provide a speech signal processing method, a speech separation method and apparatus, a computer device, and a storage medium. The technical solutions are as follows:

An aspect provides a speech signal processing method, performed by a computer device, the method including:
respectively inputting a mixed speech signal into a student model and a teacher model, the mixed speech signal including a labeled clean speech signal used for generating the mixed speech signal, and a model parameter of the teacher model being configured based on a model parameter of the student model;
determining accuracy information based on a signal outputted by the student model and the labeled clean speech signal in the mixed speech signal, the accuracy information being used for indicating a separation accuracy degree of the student model;
determining consistency information based on the signal outputted by the student model and a signal outputted by the teacher model, the consistency information being used for indicating a consistency degree between separation capabilities of the student model and the teacher model; and
adjusting the model parameter of the student model and the model parameter of the teacher model based on a plurality of pieces of accuracy information and a plurality of pieces of consistency information to obtain a speech separation model.

In an exemplary embodiment, the determining accuracy information based on a signal outputted by the student model and the labeled clean speech signal in the mixed speech signal includes any one of the following:
determining first accuracy information based on a first clean speech signal outputted by the student model and the labeled clean speech signal in the mixed speech signal; determining second accuracy information based on a first interfering signal outputted by the student model and an interfering signal other than the labeled clean speech signal in the mixed speech signal; and determining the accuracy information according to the first accuracy information and the second accuracy information.

In an exemplary embodiment, the determining consistency information based on the signal outputted by the student model and a signal outputted by the teacher model includes any one of the following:
determining first consistency information based on the first clean speech signal outputted by the student model and the second clean speech signal outputted by the teacher model; determining second consistency information based on the first interfering signal outputted by the student model and the second interfering signal outputted by the teacher model; and determining the consistency information according to the first consistency information and the second consistency information.

In an exemplary embodiment, the determining the consistency information based on a first clean speech signal outputted by the student model and a second clean speech signal outputted by the teacher model includes:
determining the consistency information based on a short-term time-varying abstract feature of the first clean speech signal and a short-term time-varying abstract feature of the second clean speech signal.

In an exemplary embodiment, the determining the consistency information based on a first clean speech signal outputted by the student model and a second clean speech signal outputted by the teacher model includes:
determining third consistency information based on a short-term time-varying abstract feature of the first clean speech signal and a short-term time-varying abstract feature of the second clean speech signal;
determining fourth consistency information based on the short-term time-varying abstract feature of the first clean speech signal and a long-term stable abstract feature of the second clean speech signal; and
determining the consistency information based on a weighted value of the third consistency information and a weighted value of the fourth consistency information.

In an exemplary embodiment, the adjusting the model parameter of the student model and the model parameter of the teacher model includes: determining the model parameter of the teacher model based on the model parameter of the student model by using an exponential moving average (EMA) method, and configuring the teacher model by using the determined model parameter of the teacher model.

In an exemplary embodiment, the method further includes:
iteratively inputting the mixed speech signal into the student model and the teacher model respectively for a plurality of iterations to obtain the plurality of pieces of the accuracy information and the plurality of pieces of the consistency information, one iteration corresponding to one respective piece of accuracy information and one respective piece of consistency information and updating the model parameter of the student model and the model parameter of the teacher model based on the plurality of pieces of the accuracy information and the plurality of pieces of the consistency information; and outputting the updated student model when the updated student model satisfies a training end condition as the speech separation model.

In an exemplary embodiment, the student model and the teacher model perform signal separation in a permutation invariant training (PIT) manner; or the student model and the teacher model perform signal separation by using a salience-based selection mechanism.

An aspect provides a speech separation method, performed by a computer device, the method including:

obtaining a sound signal;

inputting the sound signal into a speech separation model, the speech separation model being obtained based on a mixed speech signal and cooperative iterative training of a student model and a teacher model, and a model parameter of the teacher model being configured based on a model parameter of the student model; and predicting a target speech signal in the sound signal by using the speech separation model, and outputting the target speech signal in the sound signal.

In an exemplary embodiment, a loss function of an iteration is constructed based on accuracy information between an output of the student model and a training input of the student model and consistency information between the output of the student model and an output of the teacher model.

In an exemplary embodiment, the loss function of the iteration is constructed based on the following information:

accuracy information between a first clean speech signal outputted by the student model and a clean speech signal in the mixed speech signal, and consistency information between the first clean speech signal outputted by the student model and a second clean speech signal outputted by the teacher model;

or accuracy information between a first interfering signal outputted by the student model and an interfering signal in the mixed speech signal, and consistency information between the first clean speech signal outputted by the student model and the second clean speech signal outputted by the teacher model;

or first accuracy information between the first clean speech signal outputted by the student model and the clean speech signal in the mixed speech signal, second accuracy information between the first interfering signal outputted by the student model and the interfering signal in the mixed speech signal, first consistency information between the first clean speech signal outputted by the student model and the second clean speech signal outputted by the teacher model, and second consistency information between the first interfering signal outputted by the student model and second interfering signal outputted by the teacher model.

In an exemplary embodiment, the loss function of the iteration is constructed based on the following information:

a short-term time-varying abstract feature outputted by the student model and a short-term time-varying abstract feature outputted by the teacher model; or the short-term time-varying abstract feature outputted by the student model and the short-term time-varying abstract feature outputted by the teacher model, and the short-term time-varying abstract feature outputted by the student model and a long-term stable abstract feature outputted by the teacher model.

An aspect provides a computer device, including one or more processors and one or more memories storing at least one computer program, the at least one computer program being loaded and executed by the one or more processors and causing the computer device to implement the speech signal processing method or the speech separation method according to any one of the foregoing possible implementations.

An aspect provides a non-transitory computer-readable storage medium storing at least one computer program, the at least one computer program being loaded and executed by a processor of a computer device and causing the computer device to implement the speech signal processing method or the speech separation method according to any one of the foregoing possible implementations.

BRIEF DESCRIPTION OF THE DRAWINGS

To describe technical solutions in embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

Figure 1:
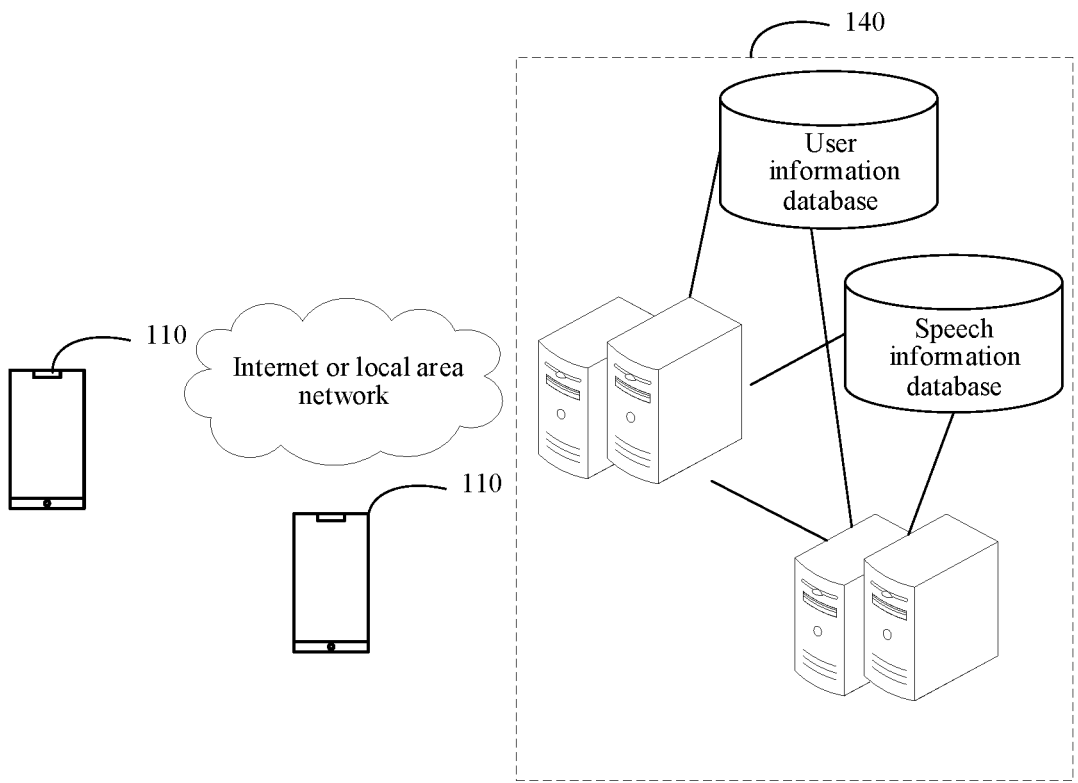
FIG. 1 is a schematic diagram of an implementation environment of a speech separation model training method according to an embodiment of this application.

To make objectives, technical solutions, and advantages of this application clearer, the following further describes implementations of this application in detail with reference to the accompanying drawings.

For ease of understanding the technical solutions in the embodiments of this application, some terms involved in the embodiments of this application are explained below.

Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology of computer science, which attempts to understand essence of intelligence and produces a new intelligent machine that can respond in a manner similar to human intelligence. AI is to study the design principles and implementation methods of various intelligent machines, to enable the machines to have the functions of perception, reasoning, and decision-making.

AI technology is a comprehensive discipline, covering a wide range of fields including both a hardware-level technology and a software-level technology. The basic AI technology generally includes technologies such as sensors, dedicated AI chips, cloud computing, distributed storage, big data processing technologies, operating/interaction systems, and mechatronics. AI software technologies mainly include a computer vision technology, a speech processing technology, a natural language processing (NLP) technology, machine learning (ML)/deep learning, and the like.

Key technologies of the speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future.

NLP is an important direction in the fields of computer science and AI. NLP studies various theories and methods for implementing effective communication between human and computers through natural languages. NLP is a science that integrates linguistics, computer science, and mathematics. Therefore, studies in this field relate to natural languages, that is, languages used by people in daily life, and NLP is closely related to linguistic studies. NLP technologies usually include text processing, semantic understanding, machine translation, robot question answering, knowledge graphs and other technologies.

ML is a multi-field interdiscipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

In recent years, the introduction of supervised learning has made some progress in solving speech separation. However, supervised learning requires manual acquisition of labeled high-quality training samples. Such a process is time-consuming, labor-intensive, and inefficient. In addition, it is impractical to acquire labeled training samples covering all types of practical application scenarios.

In view of this, FIG. 1 is a schematic diagram of an implementation environment according to an embodiment of this application. Referring to FIG. 1, the implementation environment includes a server 110 and a terminal 140. The terminal 110 is connected to the server 140 by using a wireless network or a wired network.

Optionally, the device type of the terminal 110 includes at least one of a smartphone, a tablet computer, a smart speaker, an ebook reader, a moving picture experts group audio layer III (MP3) player, a moving picture experts group audio layer IV (MP4) player, a laptop portable computer, a desktop computer, or an in-vehicle computer. An application supporting the speech separation technology is installed and run on the terminal 110. The application may be a speech assistant application, and the speech assistant application may also have functions such as data recording, audio and video playback, translation, and data query. For example, the terminal 110 is a terminal used by a user, and the application program running on the terminal 110 logs in to a user account.

Optionally, the server 140 includes at least one of one server, a plurality of servers, a cloud computing platform, or a virtualization center. The server 140 is configured to provide a back-end service for an application supporting speech separation. Optionally, the server 140 is responsible for primary speech separation work, and the terminal 110 is responsible for secondary speech separation work. Alternatively, the server 140 is responsible for secondary speech separation work, and the terminal 110 is responsible for primary speech separation work. Alternatively, the server 140 and the terminal 110 may be individually responsible for speech separation work.

Optionally, the server 140 includes: an access server, a speech server, and a database. The access server is configured to provide an access service for the terminal 110. The speech server is configured to provide a back-end service related to speech separation processing. the database may include a speech information database, a user information database, or the like. Certainly, different services provided based on the servers may correspond to different databases. There may be one or more speech servers. When there are a plurality of speech servers, at least two speech servers are configured to provide different services, and/or at least two speech servers are configured to provide the same service, for example, provide the same service in a load balancing manner. This is not limited in the embodiments of this application.

The terminal 110 may generally refer to one of a plurality of terminals. In this embodiment, the terminal 110 is merely used as an example for description.

A person skilled in the art may learn that there may be more or fewer terminals. For example, there may be only one terminal, or there may be dozens of or hundreds of or more terminals. In this case, the application environment further includes another terminal. The quantity and the device type of terminals are not limited in the embodiments of this application.

The foregoing speech separation method may be applied to a product such as an in-vehicle terminal, a TV box, a speech recognition product, a voiceprint recognition product, a smart speech assistant, or a smart speaker, or may be applied to the front end of the foregoing product, or may be implemented through the interaction between the terminal and the server.

Using an in-vehicle terminal as an example, the in-vehicle terminal may acquire a speech signal, perform speech separation on the speech signal, perform speech recognition based on a separated clean speech signal, and perform a corresponding driving control or processing process based on recognized speech content information. Using an automatic speech recognition product as an example, the terminal may acquire a speech signal and send the speech signal to the server. The server performs speech separation on the speech signal, then performs speech recognition on a separated clean speech signal, and performs recording or other subsequent corresponding processing based on recognized speech content information.

The foregoing speech recognition method may be applied to a product such as an in-vehicle terminal, a TV box, a speech recognition product, or a smart speaker, or may be applied to the front end of the foregoing product, or may be implemented through the interaction between the front end and the server.

Using an in-vehicle terminal as an example, the in-vehicle terminal may acquire a speech signal, perform speech separation on the speech signal, perform speech recognition based on a separated clean speech signal, and perform a corresponding driving control or processing process based on recognized speech content information. The in-vehicle terminal may alternatively send the speech signal to a backend server connected to the in-vehicle terminal. The backend server performs speech separation and speech recognition on the received speech signal to obtain speech content corresponding to the speech signal. The backend server may respond to the speech content corresponding to the speech signal and send the speech content or corresponding feedback information to the in-vehicle terminal. The in-vehicle terminal performs a corresponding driving control or processing process such as turning on or off a skylight, enable or disable a navigation system, or turn on or off the lights based on the obtained speech content or feedback information.

The speech separation method provided in the embodiments of this application may be applied to various speech-function-based products. The foregoing description is only for ease of understanding and does not constitute any undue limitation on the embodiments of this application.

Before model training officially starts, training samples may be generated first. Clean speech signals and interfering signals are mixed to generate mixed speech signals. Such mixed speech signals are used as the training samples. The clean speech signals in the mixed speech signals are labeled for subsequent calculation of a loss function to implement the model training.

A generation process of the mixed speech signal may be expressed by the following formula (1):

$$X = x + e \qquad (1)$$

where x represents a time-frequency point of the clean speech signal, e represents a time-frequency point of the interfering signal, and X represents a time-frequency point of the mixed speech signal.

A group of labeled training samples $\{X^{(1)}, \ldots, X^{(L)}\}$ may be obtained by labeling the clean speech signals in the mixed speech signals, and a group of non-labeled training samples $\{X^{(L+1)}, \ldots, X^{(L+U)}\}$ may be obtained if the clean speech signals in the mixed speech signals are not labeled.

Each training sample is formed by a group of time-frequency points inputted into a space, that is, $\{x = X_{t,f}\} t=1 \ldots, T; f=1 \ldots, F$. In some embodiments, for example, if the time-frequency points of the mixed speech signal are represented by a short-time Fourier transform (STFT) spectrum, T represents a quantity of input frames, and F represents a quantity of STFT frequency ranges.

Figure 2:
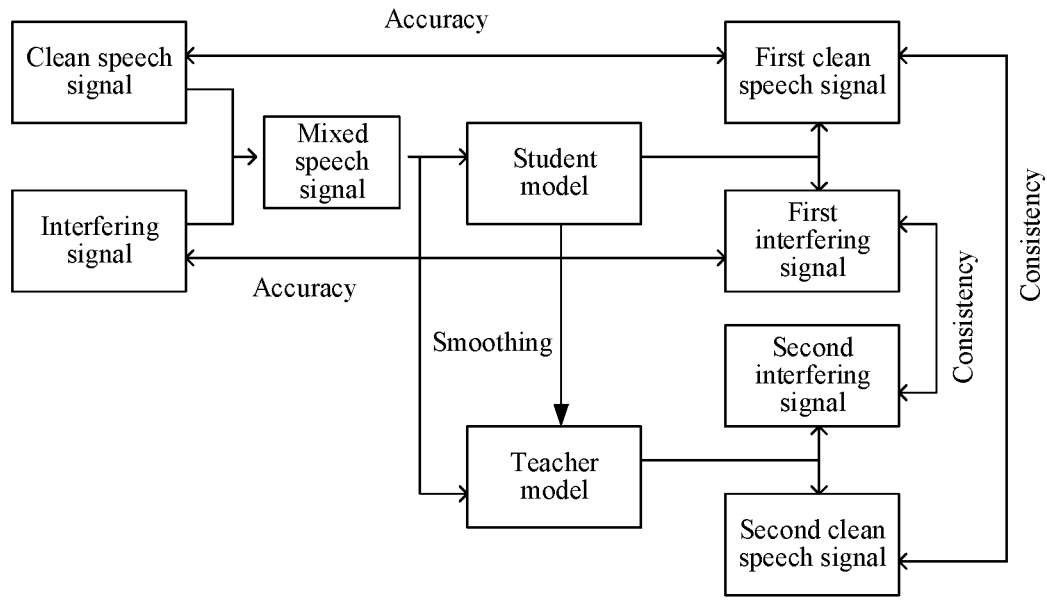
FIG. 2 is a schematic diagram of the principle of a speech separation model training method according to an embodiment of this application.
Figure 3:
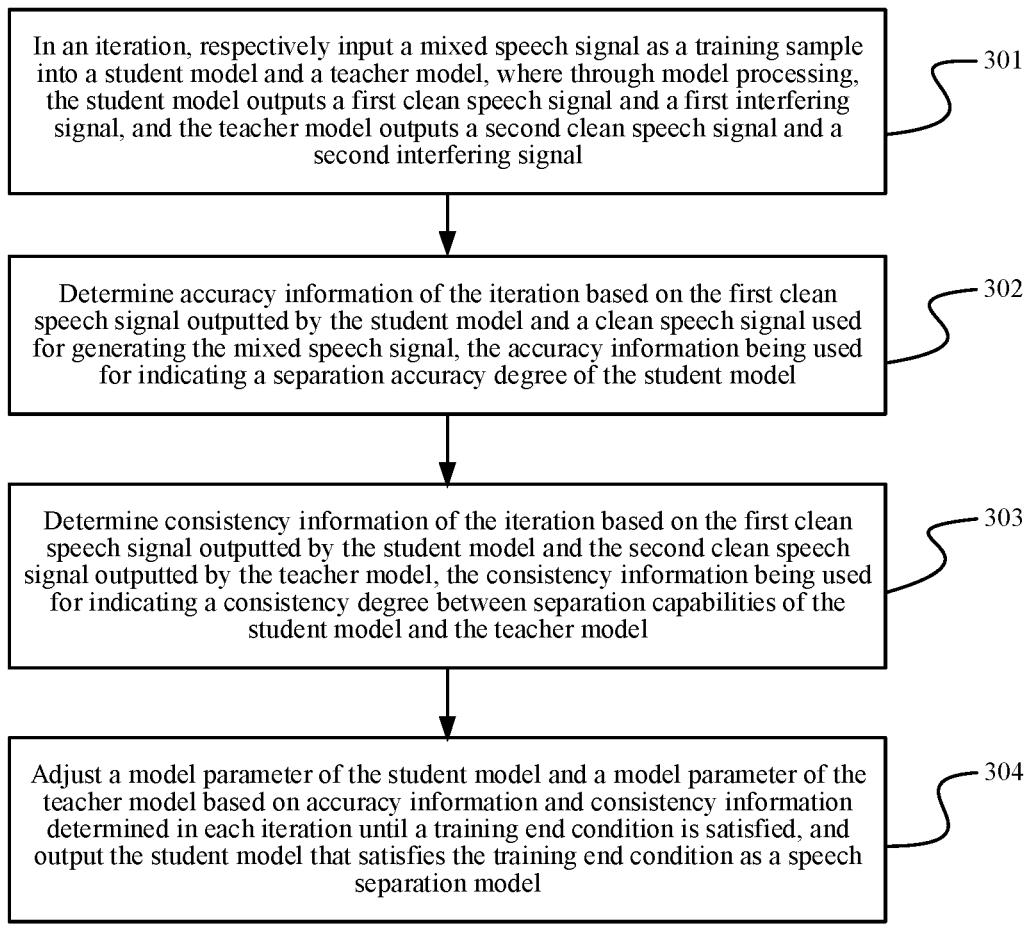
FIG. 3 is a schematic flowchart of a speech separation model training method according to an embodiment of this application.

FIG. 2 is a schematic diagram of the principle of a speech separation model training method according to an embodiment of this application. Referring to FIG. 2, a network structure used in the training includes a student model and a teacher model. In initial states of the models, a model parameter of the teacher model is configured based on a parameter of the student model. In each iteration, when the model parameter of the student model is adjusted based on a loss function, the model parameter of the teacher model is correspondingly and synchronously adjusted based on the adjusted student model, so as to implement a batch and iterative model training method. A training process of the speech separation model is briefly described based on the schematic principle diagram in FIG. 2 and a method flowchart in FIG. 3. Referring to the training flowcharts in FIG. 2 and FIG. 3, the training process may include the following steps:

301: In any iteration, a computer device respectively inputs a mixed speech signal as a training sample into the student model and the teacher model, where through model processing, the student model outputs a first clean speech signal and a first interfering signal, and the teacher model outputs a second clean speech signal and a second interfering signal.

Using a single iteration as an example, the foregoing step 301 shows a possible implementation of respectively inputting the mixed speech signal into the student model and the teacher model by the computer device. The mixed speech signal is labeled with a clean speech signal used for generating the mixed speech signal. The mixed speech signal further includes an interfering signal other than the clean speech signal. Optionally, the student model processes the mixed speech signal and outputs the first clean speech signal and the first interfering signal, and the teacher model processes the mixed speech signal and outputs the second clean speech signal and the second interfering signal.

302: The computer device determines accuracy information of the iteration based on the first clean speech signal outputted by the student model and the clean speech signal used for generating the mixed speech signal, the accuracy information being used for indicating a separation accuracy degree of the student model.

The foregoing step 302 is a possible implementation of determining the accuracy information by the computer device based on the signal outputted by the student model and the labeled clean speech signal in the mixed speech signal. Because signals outputted by the student model include the first clean speech signal and the first interfering signal, in addition to determining the accuracy information in the method provided based on step 302, the computer device can alternatively determine the accuracy information based on the first interfering signal outputted by the student model and the interfering signal in the mixed speech signal, or obtain final accuracy information by combining the above two possible implementations and weighting accuracy information obtained through the two implementations. The method of obtaining the accuracy information is not specifically limited in the embodiments of this application.

303: The computer device determines consistency information of the iteration based on the first clean speech signal outputted by the student model and the second clean speech signal outputted by the teacher model, the consistency information being used for indicating a consistency degree between separation capabilities of the student model and the teacher model.

The foregoing step 303 is a possible implementation of determining the consistency information by the computer device based on the signal outputted by the student model and the signal outputted by the teacher model. Because the signals outputted by the student model include the first clean speech signal and the first interfering signal, and signals outputted by the teacher model include the second clean speech signal and the second interfering signal, in addition to determining the consistency information in the method provided based on step 303, the computer device can alternatively determine the consistency information based on the first interfering signal outputted by the student model and the second interfering signal outputted by the teacher model, or obtain final consistency information by combining the above two possible implementations and weighting consistency information obtained through the two implementations. The method of obtaining the consistency information is not specifically limited in the embodiments of this application.

304: The computer device adjusts a model parameter of the student model and a model parameter of the teacher model based on accuracy information and consistency information determined in each iteration until a training end condition is satisfied, and outputs the student model determined in an iteration that satisfies the training end condition as a speech separation model.

The foregoing step 304 is a possible implementation of adjusting the model parameter of the student model and the model parameter of the teacher model based on a plurality of pieces of accuracy information and a plurality of pieces of consistency information by the computer device to obtain the speech separation model. One iteration corresponds to one piece of accuracy information and one piece of consistency information. By iteratively performing the foregoing steps 301 to 303, that is, iteratively inputting the mixed speech signal into the student model and the teacher model respectively for a plurality of times, the plurality of pieces of accuracy information and the plurality of pieces of consistency information can be obtained. Optionally, In the process of iteratively adjusting the model parameter of the teacher model and the model parameter of the student model, the computer device, in response to satisfying the training end condition, outputs the student model determined in the iteration that satisfies the training end condition as the speech separation model, or may output the teacher model determined in the iteration that satisfies the training end condition as the speech separation model.

In an iteration, a loss function value is determined based on accuracy information and consistency information determined in the iteration. The model parameter of the student model is adjusted based on the loss function value, and the model parameter of the teacher model is adjusted based on an adjusted model parameter. The iterative training continues to be performed based on the adjusted model until the training end condition is satisfied, and the trained student model is used as the speech separation model.

The training of the student model may actually be understood as a supervised learning process, and the training of the teacher model may be understood as a semi-supervised learning process. The teacher model allows the student model to achieve a better convergence state in the entire training process, so that the trained speech separation model has stronger separation capability and higher accuracy and consistency.

Through the technical solutions provided by the embodiments of this application, in the training process, the separation stability can be further maintained while the separation accuracy of the trained speech separation model can be improved based on the accuracy of separation results of the student model and the consistency between separation results obtained by the teacher model and the student model, thereby greatly improving the separation capability of the trained speech separation model.

The smoothing by the teacher model on the training of the student model is performed in a manner in which the model parameter of the teacher model changes with the model parameter of the student model in each iteration and the consistency between outputs of the teacher model and the student model during the construction of the loss function is considered. Optionally, the model parameter of the teacher model may be configured in the following manner in each iteration: determining the model parameter of the teacher model based on the model parameter of the student model by using an EMA method, and configuring the teacher model by using the determined model parameter of the teacher model. The configuration process may be considered as a smoothing process of the model parameter.

Using a parameter of an encoder in the teacher model as an example, in any iteration, the parameter of the encoder in the teacher model is calculated through the following formula (2):

$$\theta_l' = \alpha \theta_{l-1}' + (1-\alpha)\theta_l \quad (2)$$

where $\alpha$ is a smoothing coefficient of the parameter, l is the quantity of iterations, l is a positive integer greater than 1, and $\theta$ and $\theta'$ are parameters of encoders in the student model and the teacher model respectively.

Using a parameter of an abstract feature extractor in the teacher model as an example, in any iteration, the parameter of the abstract feature extractor in the teacher model is calculated through the following formula (3):

$$\psi_l' = \alpha \psi_{l-1}' + (1-\alpha)\psi_l \quad (3)$$

where $\sigma$ is a smoothing coefficient of the parameter, l is the quantity of iterations, l is a positive integer greater than 1, and $\psi$ and $\psi'$ are parameters of abstract feature extractors in the student model and the teacher model respectively.

The foregoing parameter calculation methods are merely a few examples of configuring the model parameter of the teacher model based on the model parameter of the student model. Other methods may be adopted for calculating the model parameter, and the model parameter may alternatively include another type of parameter. This is not limited in the embodiments of this application.

The following is an exemplary description of an internal processing flow of the model during the model training process based on the foregoing steps.

In any iteration, a mixed speech signal as a training sample is respectively inputted into the student model and the teacher model, where through model processing, the student model outputs a first clean speech signal and a first interfering signal, and the teacher model outputs a second clean speech signal and a second interfering signal.

Figure 4:
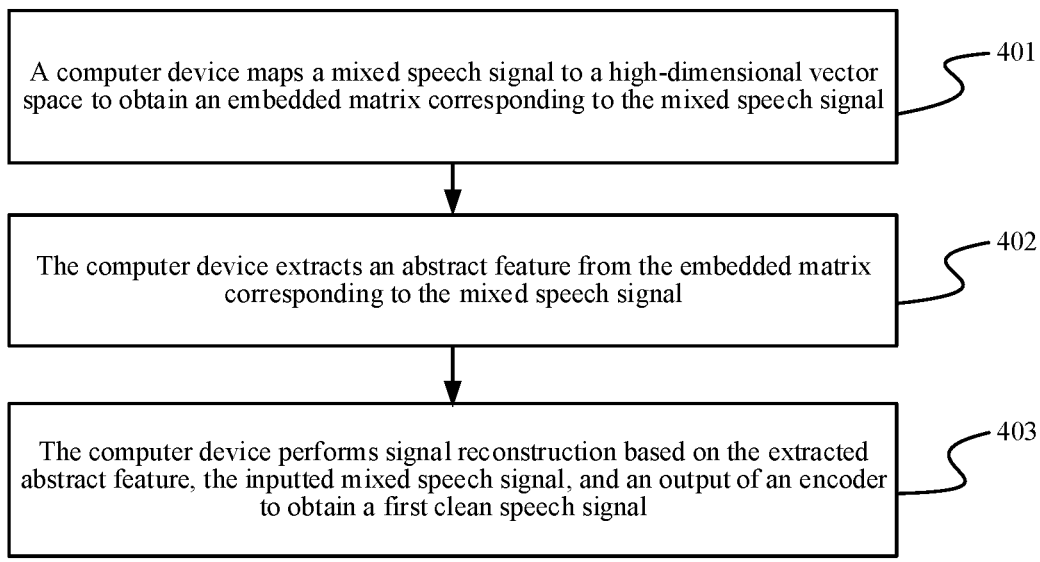
FIG. 4 is a schematic flowchart of processing a mixed speech signal by a student model according to an embodiment of this application.
Figure 5:
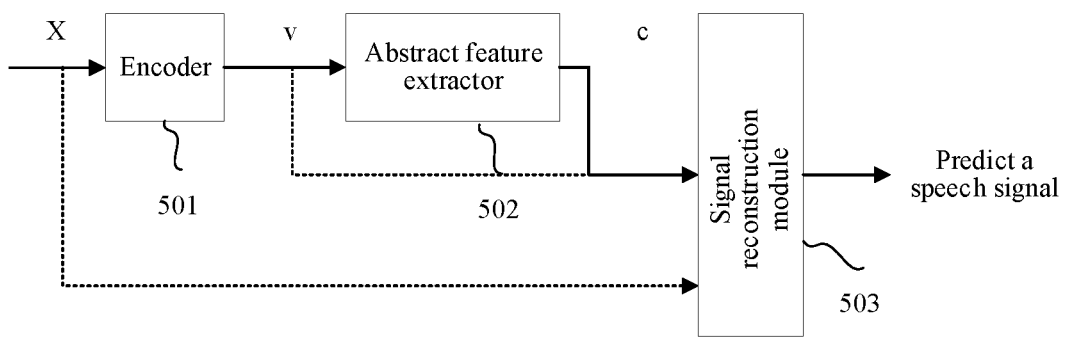
FIG. 5 is a schematic structural diagram of the inside of a student model according to an embodiment of this application.

The student model and the teacher model may have the same model structure, that is, processing flows of the two models may be the same. Therefore, a description is made below first based on the model structure and the processing flow of the student model. FIG. 4 is a schematic flowchart of processing a mixed speech signal by a student model according to an embodiment of this application. FIG. 5 is a schematic diagram of an internal structure implementing the foregoing model. Referring to FIG. 4, the flow specifically includes the following steps.

401: A computer device maps a mixed speech signal to a high-dimensional vector space to obtain an embedded matrix corresponding to the mixed speech signal.

Step 401 is a process of performing feature conversion on the mixed speech signal, in which the mixed speech signal can be converted into the form in which the mixed speech signal is inputted into a model. In an exemplary embodiment, the computer device performs framing and windowing on the mixed speech signal, performs fast Fourier transform (FFT) on frames to convert time domain signals into frequency domain signals, arranges the obtained frequency domain signals in a time sequence so that a feature matrix representing the mixed speech signal can be obtained, and maps the feature matrix to a high-dimensional vector space so that the embedded matrix corresponding to the mixed speech signal can be obtained.

A feature of the mixed speech signal may be a short-time Fourier transform sound spectrum feature, a log-Mel spectrum feature, a Mel-frequency cepstral coefficient (MFCC) feature, or a prediction score after a previous convolutional neural network (CNN), or may be a feature of another factor or a combination of various features. This is not limited in the embodiments of this application.

The foregoing step 401 can be implemented by using an encoder 501 in FIG. 5. A processing process of the encoder is described by using an example in which the converted feature is a short-time Fourier transform sound spectrum.

The mixed speech signal is inputted into the encoder, and the encoder obtains a feature matrix of the short-time Fourier transform sound spectrum of the mixed speech signal, then maps the feature matrix to a high-dimensional vector space, and outputs the embedded matrix corresponding to the mixed speech signal. For example, $X \subseteq R^{TF}$ may be used for representing the feature matrix (where T and F respectively represent a quantity of frames and a quantity of frequency ranges of the mixed speech signal inputted into the encoder) obtained after the encoder processes the mixed speech signal, and a process in which the encoder maps the feature matrix into the high-dimensional vector space and outputs the embedded matrix v of the mixed speech signal can be expressed as $E_\theta$: $X \rightarrow v \subseteq R^{TF \times D}$, where $\theta$ is the model parameter of the encoder.

402: The computer device extracts an abstract feature from the embedded matrix corresponding to the mixed speech signal.

Step 402 is a process of feature extraction. An extracted feature may be used for representing the mixed speech signal and providing a basis for subsequent speech signal reconstruction.

The step can be implemented by an abstract feature extractor 502 in FIG. 5. The abstract feature extractor may be an autoregressive model. For example, a long short term memory network (LSTM) model is adopted in a causal system, or a bi-directional long short-term memory (Bi-LSTM) model is adopted in a non-causal system, to extract short-term abstract features or long-term abstract features in a time sequence from the embedded matrix corresponding to the mixed speech signal. A recurrent model or a summary function may be alternatively adopted to extract global abstract features from the embedded matrix. A specific model structure of the abstract feature extractor and types of extracted abstract features are not limited in the embodiments of this application.

A processing process of the abstract feature extractor is described by using an autoregressive model as an example.

In an exemplary embodiment, a weight P is given, and a calculation formula for feature extraction is as follows:

$$c_t = \frac{\sum_f v_{t,f} e p_{t,f}}{\sum_f p_{t,f}} \qquad (4)$$

where $c_t \in c$, which represents a short-term time-varying abstract feature, $v \in v$, which represents the embedded matrix, $p \in P$, which represents the weight, e represents a dot product of elements, t and f respectively represent a frame index and a frequency range index of the short-time Fourier transform sound spectrum.

In an exemplary embodiment, a feature obtained through the foregoing feature extraction may be further reshaped to remove a matrix element whose value is less than a particular threshold, thereby eliminating the impact of low-energy noise on the feature extraction. For example, in the embodiments of this application, the feature matrix may be normalized, an element whose value is less than a particular threshold is set to 0, and other elements are set to 1. For example, the computer device may multiply formula (4) by a binary threshold matrix, which helps to reduce the impact of low-energy noise on the abstract feature extraction process. In this case, a calculation formula (5) is as follows:

$$c_t = \frac{\sum_f v_t e p_t e w_t}{\sum_f p_t e w_t} \qquad (5)$$

where $w \in R^{TF}$, which represents the binary threshold matrix.

$$w_{t,f} = \begin{cases} 0, & \text{if } X_{t,f} < \max(X)/100 \\ 1, & \text{otherwise} \end{cases} \qquad (6)$$

The foregoing process of extracting the abstract feature c from the embedded matrix v by the abstract feature extractor may be simply expressed as $A_\psi$: $v \rightarrow P \subseteq R^{TF}$, $v \times P \rightarrow c \subseteq R^D$, where $\psi$ is a model parameter of the abstract feature extractor.

403: The computer device performs signal reconstruction based on the extracted abstract feature, the inputted mixed speech signal, and an output of the encoder to obtain a first clean speech signal.

Through speech signal reconstruction based on the input, a new set of speech signals can be obtained, which provides a basis for the following speech signal comparison and calculation of a training loss. For convenience of representation, a speech signal outputted by the student model is named the first clean speech signal.

The step can be implemented by a signal reconstruction module 503 in FIG. 5. The signal reconstruction module 503 may adopt any signal reconstruction algorithm for the speech signal reconstruction according to the extracted abstract feature, the clean speech signal, and a feature of the embedded matrix, to output the first clean speech signal and a first interfering signal. The output first clean speech signal and the first interfering signal can be used for calculating a loss function value of this iteration, and training the model through back propagation.

In an exemplary structure, the encoder may adopt a four-layer Bi-LSTM structure. Each hidden layer has 600 nodes, which can map a 600-dimensional hidden vector to a 257*40-dimensional high-dimensional vector space, and an output layer has 40 nodes. The encoder processes the mixed speech signal with parameter settings of a 16 KHz sampling rate, a 25 ms window length, a 10 ms window shift, and 257 frequency ranges. 32 frames are randomly downsampled for each training corpus. An abstract feature extractor connected to the encoder may include a fully connected layer that can map a 257*40-dimensional hidden vector to be 600-dimensional. The signal reconstruction module may be a two-layer Bi-LSTM structure with 600 nodes in each hidden layer.

At least one of the encoder, the abstract feature extractor, or the signal reconstruction module may be added with more layers or changed to another model type according to the complexity of actual application and performance requirements. The model type and topological structure of the foregoing structure are not specifically limited in the embodiments of this application, and the structure may be replaced with another effective new model structure such as a long short-term memory network, a convolutional neural network, a time delay network, or a gated convolutional neural network or a model structure that combines various network structures.

The content of the foregoing embodiment only describes the model structure and processing flow of the student model. In the embodiments of this application, the model structure and processing flow of the teacher model may be the same as those of the student model. Certainly, the teacher model may alternatively adopt a little more complex structure to extract features with different time-domain characteristics, so as to perform signal reconstruction based on the features with different time-domain characteristics, and further perform loss function value calculation and back-propagation model training based on a result of the reconstruction.

For example, for the student model, an abstract feature with a higher resolution in the time domain, that is, a short-term time-varying abstract feature, may be extracted based on the method shown in formula (5). For the teacher model, a short-term time-varying abstract feature may also be extracted through the same process. However, in a possible implementation, for the teacher model, when feature extraction is performed, an abstract feature with a lower resolution in the time domain may be alternatively extracted. For ease of expression, the abstract feature with a lower resolution in the time domain is referred to as a long-term stable abstract feature. The feature may be represented by the following formula (7):

$$c'_L = \frac{\sum_{t,f} v' ep' ew}{\sum_{t,f} p' ew} \qquad (7)$$

where $c_L' \in c'$, which represents the long-term stable abstract feature, $v' \in v'$, which represents a high-dimensional embedded matrix, $p' \in P'$, which represents a weight, e represents a dot product of elements, t and f respectively represent a frame index and a frequency range index of the short-time Fourier transform sound spectrum, and w represents the binary threshold matrix in formula (6). Certainly, in this embodiment, the binary threshold matrix may be not multiplied. This is not limited in this application.

Such an abstract feature with a lower resolution in the time domain, that is, a long-term stable abstract feature, is suitable for generalizing hidden speaker features, while an abstract feature with a higher resolution in the time domain, that is, a short-term time-varying abstract feature, is more suitable for a task that requires a high time-domain resolution such as spectrum reconstruction for a speaker.

In the process of training to obtain the model parameter of the student model, two types of training objectives are comprehensively adopted. The first type is supervised training with a training objective of improving the accuracy, and the second type is consistent learning between the teacher model and the student model.

For the training objective of improving the accuracy, the accuracy information of the iteration needs to be determined based on the signal outputted by the student model and the labeled clean speech signal in the mixed speech signal. A specific process of determining the accuracy information may include any one of the following:

the first implementation: determining the accuracy information of the iteration based on the first clean speech signal outputted by the student model and the labeled clean speech signal in the mixed speech signal;

the second implementation: determining the accuracy information of the iteration based on the first interfering signal outputted by the student model and an interfering signal other than the labeled clean speech signal in the mixed speech signal; or the third implementation: determining first accuracy information of the iteration based on the first clean speech signal outputted by the student model and the labeled clean speech signal in the mixed speech signal; determining second accuracy information of the iteration based on the first interfering signal outputted by the student model and the interfering signal other than the labeled clean speech signal in the mixed speech signal; and determining the accuracy information of the iteration according to the first accuracy information and the second accuracy information.

The first clean speech signal may be, for example, a speech signal with the highest energy shown in formula (8), or a speech signal determined based on a PIT algorithm of formula (9). Certainly, the first clean speech signal may be alternatively a speech signal determined based on other methods. This is not limited in the embodiments of this application.

The accuracy information is used for determining a difference between a separated signal and a reference signal. For example, the accuracy information may be a mean-square error (MSE) between frequency spectra of the signals, or may be a scale invariant signal to noise ratio (SI-SNR) objective function. This is not specifically limited in the embodiments of this application.

Using accuracy calculation by using the most intuitive salience-based selection mechanism as an example, an MSE between the first clean speech signal with the highest energy and the labeled clean speech signal may be calculated by using the following formula (8):

$$L^{(MSE)}_{\theta,\psi} = \sum_{t,f} \|x - XgSigmoid(c_t^T v_{t,f})\|_2^2 \qquad (8)$$

where x represents the labeled clean speech signal, X represents the mixed speech signal, c represents the abstract feature, v represents the embedded matrix, t and f respectively represent the frame index and the frequency range index of the short-time Fourier transform sound spectrum.

Using accuracy calculation by using a PIT method as another example, an MSE between all possible first clean speech signals and the labeled clean speech signal and an MSE between all possible first interfering signals and a labeled interfering signal may be calculated by using the following formula (9):

$$L_{\theta,\psi}^{(MSE)} = \min_{c_t \in \{c_{t1}, c_{t2}\}} \sum_{t,f} \|x - XgSigmoid(c_t^T, v_{t,f})\|_2^2 + \quad (9)$$

$$\min_{c_t \in \{c_{t1}, c_{t2}\}} \sum_{t,f} \|e - XgSigmoid(c_t^T, v_{t,f})\|_2^2$$

where x represents the labeled clean speech signal, X represents the mixed speech signal, e represents the interfering signal, c represents the abstract feature, v represents the embedded matrix, t and f respectively represent the frame index and the frequency range index of the short-time Fourier transform sound spectrum.

The foregoing three implementations may be understood as a method for constructing a loss function, that is, which type of input and output is used for constructing the loss function, so that back-propagation training can be performed on the model based on the loss function. The loss function is a reconstruction-type objective function. Using a supervised identification learning model of the objective function can ensure the encoding of speech information of a target speaker by using a learned representation to a certain extent, so that the supervised discriminative learning combined with a speech separation task can enable the student model to effectively estimate a short-term time-varying abstract feature.

For the consistency learning between the teacher model and the student model, the consistency information of the iteration needs to be determined based on the signal outputted by the student model and the signal outputted by the teacher model. A specific process of determining the consistency information may include any one of the following:

the first implementation: determining the consistency information of the iteration based on the first clean speech signal outputted by the student model and the second clean speech signal outputted by the teacher model;

the second implementation: determining the consistency information of the iteration based on the first interfering signal outputted by the student model and the second interfering signal outputted by the teacher model; or the third implementation: determining first consistency information of the iteration based on the first clean speech signal outputted by the student model and the second clean speech signal outputted by the teacher model; determining second consistency information of the iteration based on the first interfering signal outputted by the student model and the second interfering signal outputted by the teacher model; and determining the consistency information of the iteration according to the first consistency information and the second consistency information.

The first clean speech signal may be, for example, a speech signal with the highest energy shown in formula (8), or a speech signal determined based on a PIT algorithm of formula (9). Certainly, the first clean speech signal may be alternatively a speech signal determined based on other methods. This is not limited in the embodiments of this application.

The consistency information is used for indicating a difference between a spectrum of a target speaker estimated by the teacher model and a spectrum of the target speaker estimated by the student model. For example, the consistency information may be an MSE between spectra of signals, or may be a SI-SNR. This is not specifically limited in the embodiments of this application.

The foregoing three implementations may be understood as a method for constructing a loss function, that is, which type of input and output is used for constructing the loss function, so that back-propagation training can be performed on the model based on the loss function. The loss function constructed herein is used for calculating the difference between the spectrum of the target speaker estimated by the teacher model and the spectrum of the target speaker estimated by the student model.

As for the teacher model, as mentioned in the foregoing embodiments, the teacher model may have two types of features, one is a short-term time-varying abstract feature, and the other is a long-term stable abstract feature. The consistency information may be determined based on the two types of features. Third consistency information of the iteration is determined based on a short-term time-varying abstract feature of the first clean speech signal and a short-term time-varying abstract feature of the second clean speech signal outputted by the teacher model. Fourth consistency information of the iteration is determined based on the short-term time-varying abstract feature of the first clean speech signal and the long-term stable abstract feature of the second clean speech signal outputted by the teacher model. Optionally, the final consistency information of the iteration is constructed based on a weighted value of the third consistency information and a weighted value of the fourth consistency information.

Correspondingly, the loss function may be constructed based on only the short-term time-varying abstract features of the student model and the teacher model, or may be constructed based on the short-term time-varying abstract features of the student model and the teacher model and the long-term stable abstract feature of the teacher model.

For example, when the loss function is constructed based on the short-term time-varying abstract features of the student model and the teacher model, the following formula (10) may be adopted:

$$L_{\theta,\psi}^{(MSE)short} = \sum_{t,f} \|Xg(Sigmoid(c_t'^T v_{t,f}') - Sigmoid(c_t^T v_{t,f}))\|_2^2 \quad (10)$$

where X represents the mixed speech signal, $c_t$ and $c_t'$ respectively represent short-term time-varying abstract features predicted by the student model and the teacher model, v and v' respectively represent embedded matrices of the student model and the teacher model, and t and f respectively represent the frame index and the frequency range index of the short-time Fourier transform sound spectrum.

For example, when the loss function is constructed based on the short-term time-varying abstract features of the student model and the teacher model and the long-term stable abstract feature of the teacher model, the following formula (11) may be adopted:

$$L_{\theta,\psi}^{(MSE)long} = \sum_{t,f} \|Xg(Sigmoid(c_L'^T v_{t,f}') - Sigmoid(c_t^T v_{t,f}))\|_2^2 \quad (11)$$

where X represents the mixed speech signal, $c_L'$ represents a long-term stable abstract feature predicted by the teacher model, c represents a short-term time-varying abstract feature predicted by the student model, v and v' respectively represent the embedded matrices of the student model and the teacher model, and t and f respectively represent the frame index and the frequency range index of the short-time Fourier transform sound spectrum.

The whole model training needs to be performed with reference to the accuracy and the consistency. In each iteration, the model parameter of the student model and the model parameter of the teacher model are adjusted based on accuracy information and consistency information determined in the iteration until a training end condition is satisfied, and the student model determined in an iteration that satisfies the training end condition is outputted as the speech separation model. The foregoing processes respectively describe the construction of the loss function with the training objective as the accuracy and the construction of the loss function with the training objective as the consistency between the models. To perform training with reference to the accuracy information and the consistency information, a joint loss function that can express the accuracy information and the consistency information needs to be established.

In an exemplary embodiment, during adjustment of the model parameters, the model parameter of the student model and the model parameter of the teacher model may be adjusted based on the third consistency information and the accuracy information determined in each iteration. That is, the joint loss function may be expressed by the following formula (12):

$$L = \underbrace{L_{\theta,\psi}^{(MSE)}}_{correctness} + \underbrace{\lambda L_{\theta,\psi}^{(MSE)\text{-}short}}_{consistency} \quad (12)$$

where $\underbrace{L_{\theta,\psi}^{(MSE)}}_{correctness}$ represents the loss function with the training objective as the accuracy, $$\underbrace{L_{\theta,\psi}^{(MSE)\text{-}short}}_{consistency}$$

represents the loss function with the training objective as the consistency, which may be specifically a loss function constructed based on the short-term time-varying abstract features, $\lambda$ is a weight factor and $\lambda$ may be continuously optimized in a neural network iteration until an optimal value is matched.

In an exemplary embodiment, during adjustment of the model parameters, the model parameter of the student model and the model parameter of the teacher model may be adjusted based on the weighted values of the third consistency information and the fourth consistency information and the accuracy information determined in each iteration. That is, the joint loss function may be expressed by the following formula (13):

$$L = \underbrace{L_{\theta,\psi}^{(MSE)}}_{correctness} + \underbrace{\lambda_1 L_{\theta,\psi}^{(MSE)\text{-}short} + \lambda_2 L_{\theta,\psi}^{(MSE)\text{-}long}}_{consistency} \quad (13)$$

where $\underbrace{L_{\theta,\psi}^{(MSE)}}_{correctness}$ represents the loss function with the training objective as the accuracy, $$\underbrace{\lambda_1 L_{\theta,\psi}^{(MSE)\text{-}short} + \lambda_2 L_{\theta,\psi}^{(MSE)\text{-}long}}_{consistency}$$

represents a loss function constructed based on the short-term time-varying abstract features and the long-term stable abstract feature, $\lambda_1$ and $\lambda_2$ are weight factors. $\lambda_1$ and $\lambda_2$ may be continuously optimized in a neural network iteration until optimal values are matched.

The foregoing training end condition may be a condition that, for example, a quantity of iterations reaches a target quantity of times or the loss function tends to be stable. This is not limited in the embodiments of this application. For example, in the model training process, if a batch data size is set to 32, an initial learning rate is 0.0001, and a weight reduction coefficient of the learning rate is 0.8, when a loss function value of the model does not improve in three consecutive iterations, the training is considered to reach convergence and the training ends.

Through the training method provided in the embodiments of this application, stable features of a hidden target speaker can be automatically learned without any additional PIT processing, speaker tracking mechanism, or processing and adjustment defined by experts. According to another aspect, the consistency-based training used in this application does not require labeled information, so that unsupervised information can be mined from massive unlabeled data to help improve the robustness and versatility of the system. In addition, the embodiments of this application have been tested to fully verify the effectiveness of the speech separation model trained based on the consistency between the student model and the teacher model. Under conditions of various interference environments and various signal-to-noise ratios, including conditions of interference from 0 dB to 20 dB background music, interference from other speakers, and interference from background noise, the separation performance of the speech separation model in the embodiments of this application is excellent in terms of speech quality perceptual evaluation, short-term objective intelligibility, signal-to-distortion, and other indicators and stability.

Figure 6:
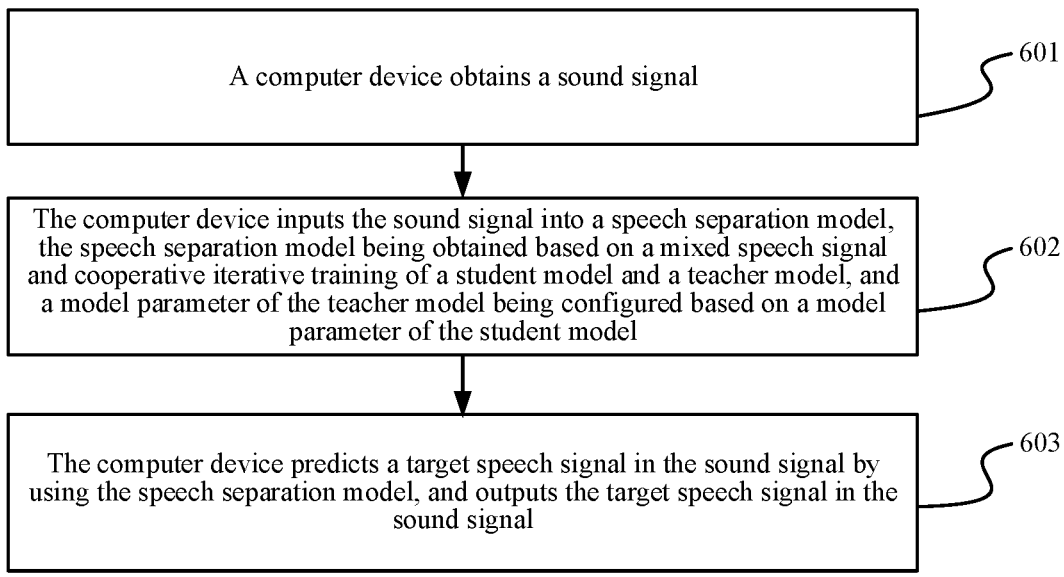
FIG. 6 is a flowchart of a speech separation method according to an embodiment of this application.

Based on the speech separation model obtained through the foregoing training, the embodiments of this application further provide a speech separation method. Referring to a flowchart of the speech separation method in FIG. 6, the method may include the following steps.

601: A computer device obtains a to-be-separated sound signal.

602: The computer device inputs the sound signal into a speech separation model, the speech separation model being obtained based on a mixed speech signal and cooperative iterative training of a student model and a teacher model, and a model parameter of the teacher model being configured based on a model parameter of the student model.

603: The computer device predicts a target speech signal in the sound signal by using the speech separation model, and outputs the target speech signal in the sound signal.

In an exemplary embodiment, a loss function of an iteration is constructed based on accuracy information between an output of the student model and a training input of the student model and consistency information between the output of the student model and an output of the teacher model.

In an exemplary embodiment, the loss function of the iteration is constructed based on the following information:
accuracy information between a first clean speech signal outputted by the student model and a clean speech signal in the mixed speech signal, and consistency information between the first clean speech signal outputted by the student model and a second clean speech signal outputted by the teacher model;

or accuracy information between a first interfering signal outputted by the student model and an interfering signal in the mixed speech signal, and consistency information between the first clean speech signal outputted by the student model and the second clean speech signal outputted by the teacher model;

or first accuracy information between the first clean speech signal outputted by the student model and the clean speech signal in the mixed speech signal, second accuracy information between the first interfering signal outputted by the student model and the interfering signal in the mixed speech signal, first consistency information between the first clean speech signal outputted by the student model and the second clean speech signal outputted by the teacher model, and second consistency information between the first interfering signal outputted by the student model and second interfering signal outputted by the teacher model.

In an exemplary embodiment, the loss function of the iteration is constructed based on the following information:

a short-term time-varying abstract feature outputted by the student model and a short-term time-varying abstract feature outputted by the teacher model; or the short-term time-varying abstract feature outputted by the student model and the short-term time-varying abstract feature outputted by the teacher model, and the short-term time-varying abstract feature outputted by the student model and a long-term stable abstract feature outputted by the teacher model.

The foregoing model training process and the speech separation process may be performed by different computer devices respectively. After the model training is completed, the speech separation process may be provided to a front end or a computer device at an application side for performing a speech separation task. The speech separation task may be a subtask for performing speech separation in tasks such as speech recognition. After the speech separation is completed, a separated signal may be further used in a specific processing procedure such as speech recognition. This is not limited in the embodiments of this application.

Figure 7:
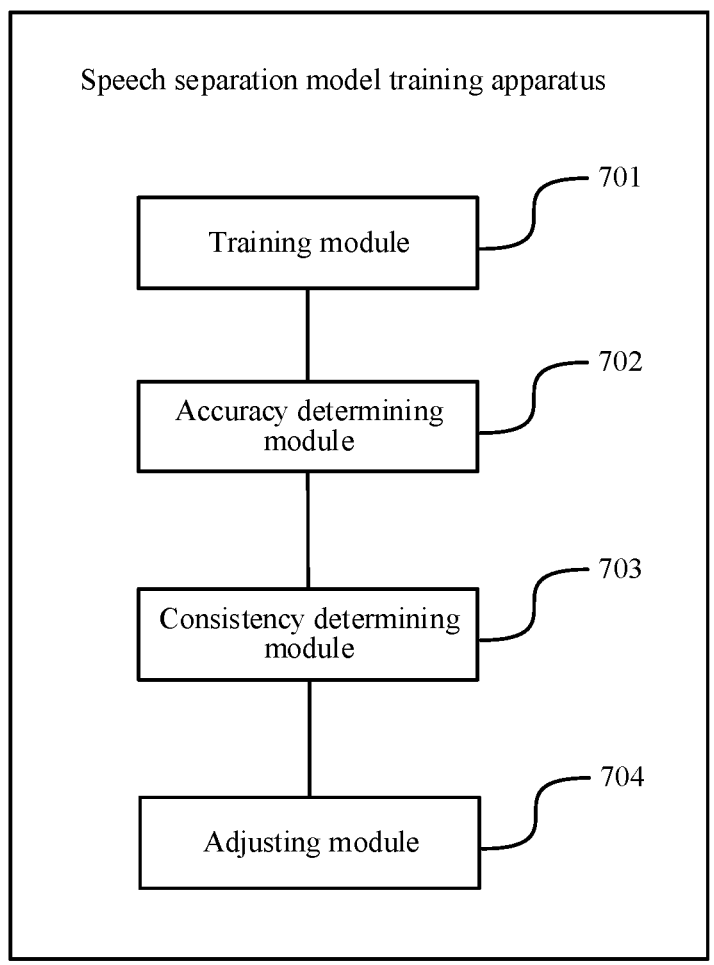
FIG. 7 is a schematic structural diagram of a speech separation model training apparatus according to an embodiment of this application.

FIG. 7 is a schematic structural diagram of a speech separation model training apparatus according to an embodiment of this application. Referring to FIG. 7, the apparatus includes:

a training module 701, configured to respectively input a mixed speech signal as a training sample into a student model and a teacher model in any iteration, the mixed speech signal including a labeled clean speech signal used for generating the mixed speech signal, and a model parameter of the teacher model being configured based on a model parameter of the student model;

That is, the training module 701 is configured to respectively input the mixed speech signal into the student model and the teacher model, the mixed speech signal being labeled with the clean speech signal used for generating the mixed speech signal, and the model parameter of the teacher model being configured based on the model parameter of the student model.

An accuracy determining module 702 is configured to determine accuracy information of the iteration based on a signal outputted by the student model and the labeled clean speech signal in the mixed speech signal inputted into the model, the accuracy information being used for indicating a separation accuracy degree of the student model;

That is, the accuracy determining module 702 is configured to determine the accuracy information based on the signal outputted by the student model and the labeled clean speech signal in the mixed speech signal, the accuracy information being used for indicating a separation accuracy degree of the student model.

A consistency determining module 703 is configured to determine consistency information of the iteration based on the signal outputted by the student model and a signal outputted by the teacher model, the consistency information being used for indicating a consistency degree between separation capabilities of the student model and the teacher model.

That is, the consistency determining module 703 is configured to determine the consistency information based on the signal outputted by the student model and the signal outputted by the teacher model, the consistency information being used for indicating the consistency degree between separation capabilities of the student model and the teacher model.

An adjusting module 704 is configured to adjust the model parameter of the student model and the model parameter of the teacher model based on accuracy information and consistency information determined in each iteration until a training end condition is satisfied, and output the student model determined in an iteration that satisfies the training end condition as the speech separation model.

That is, the adjusting module 704 is configured to adjust the model parameter of the student model and the model parameter of the teacher model based on the plurality of pieces of accuracy information and the plurality of pieces of consistency information to obtain the speech separation model.

In an exemplary embodiment, the accuracy determining module 702 is configured to perform any one of the following steps:

determining the accuracy information of the iteration based on a first clean speech signal outputted by the student model and the labeled clean speech signal in the mixed speech signal;

determining the accuracy information of the iteration based on a first interfering signal outputted by the student model and an interfering signal other than the labeled clean speech signal in the mixed speech signal; or determining first accuracy information of the iteration based on the first clean speech signal outputted by the student model and the labeled clean speech signal in the mixed speech signal; determining second accuracy information of the iteration based on the first interfering signal outputted by the student model and the interfering signal other than the labeled clean speech signal in the mixed speech signal; and determining the accuracy information of the iteration according to the first accuracy information and the second accuracy information.

In an exemplary embodiment, the consistency determining module 703 is configured to perform any one of the following steps:

determining the consistency information of the iteration based on a first clean speech signal outputted by the student model and a second clean speech signal outputted by the teacher model;

determining the consistency information of the iteration based on a first interfering signal outputted by the student model and a second interfering signal outputted by the teacher model; or determining first consistency information of the iteration based on the first clean speech signal outputted by the student model and the second clean speech signal outputted by the teacher model; determining second consistency information of the iteration based on the first interfering signal outputted by the student model and the second interfering signal outputted by the teacher model; and determining the consistency information of the iteration according to the first consistency information and the second consistency information.

In an exemplary embodiment, the adjusting module 704 is configured to determine the model parameter of the teacher model based on the model parameter of the student model by using an EMA method, and configure the teacher model by using the determined model parameter of the teacher model.

In an exemplary embodiment, the consistency determining module 703 is configured to determine third consistency information of the iteration (that is, determine the consistency information) based on a short-term time-varying abstract feature of the first clean speech signal and a short-term time-varying abstract feature of the second clean speech signal outputted by the teacher model.

In an exemplary embodiment, the consistency determining module 703 is configured to:

determine third consistency information of the iteration based on a short-term time-varying abstract feature of the first clean speech signal and a short-term time-varying abstract feature of the second clean speech signal outputted by the teacher model;

determine fourth consistency information of the iteration based on the short-term time-varying abstract feature of the first clean speech signal and a long-term stable abstract feature of the second clean speech signal outputted by the teacher model; and determining the consistency information based on a weighted value of the third consistency information and a weighted value of the fourth consistency information.

In an exemplary embodiment, based on the apparatus composition of FIG. 7, the apparatus further includes an iteration and obtaining module, configured to iteratively input the mixed speech signal into the student model and the teacher model respectively for a plurality of times to obtain the plurality of pieces of accuracy information and the plurality of pieces of consistency information, one iteration being corresponding to one piece of accuracy information and one piece of consistency information, where the iteration and obtaining module is further configured to output, in response to satisfying a training end condition, the student model determined in an iteration that satisfies the training end condition as the speech separation model.

In an exemplary embodiment, the student model and the teacher model perform signal separation in a PIT manner; or the student model and the teacher model perform signal separation by using a salience-based selection mechanism.

When the speech separation model training apparatus provided in the foregoing embodiment performs training for a speech separation model, division of the foregoing functional modules is merely an example for descriptions. During actual application, the foregoing functions may be allocated to and completed by different functional modules according to requirements. That is, the internal structure of the apparatus is divided into different functional modules, to complete all or some of the foregoing described functions. In addition, the speech separation model training apparatus and speech separation model training method embodiments provided in the foregoing embodiments belong to one conception. For the specific implementation process, reference may be made to the method embodiments, and details are not described herein again.

Figure 8:
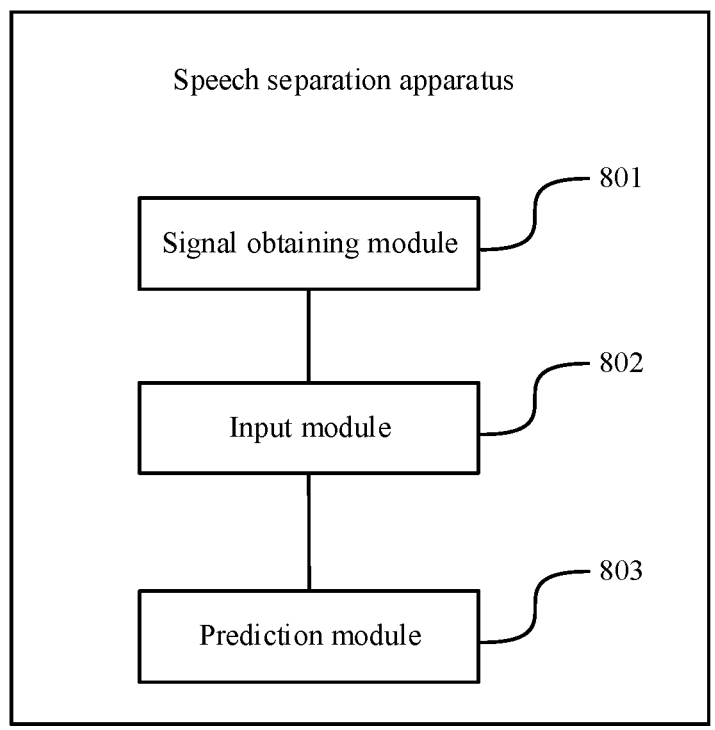
FIG. 8 is a schematic structural diagram of a speech separation apparatus according to an embodiment of this application.

FIG. 8 is a schematic structural diagram of a speech separation apparatus according to an embodiment of this application. Referring to FIG. 8, the apparatus includes:

a signal obtaining module 801, configured to obtain a to-be-separated sound signal;

an input module 802, configured to input the sound signal into a speech separation model, the speech separation model being obtained based on a mixed speech signal and cooperative iterative training of a student model and a teacher model, and a model parameter of the teacher model being configured based on a model parameter of the student model; and a prediction module 803, configured to predict a target speech signal in the sound signal by using the speech separation model, and output the target speech signal in the sound signal.

In an exemplary embodiment, a loss function of an iteration is constructed based on accuracy information between an output of the student model and a training input of the student model and consistency information between the output of the student model and an output of the teacher model.

In an exemplary embodiment, the loss function of the iteration is constructed based on the following information:

accuracy information between a first clean speech signal outputted by the student model and a clean speech signal in the mixed speech signal, and consistency information between the first clean speech signal outputted by the student model and a second clean speech signal outputted by the teacher model;

or accuracy information between a first interfering signal outputted by the student model and an interfering signal in the mixed speech signal, and consistency information between the first clean speech signal outputted by the student model and the second clean speech signal outputted by the teacher model;

or first accuracy information between the first clean speech signal outputted by the student model and the clean speech signal in the mixed speech signal, second accuracy information between the first interfering signal outputted by the student model and the interfering signal in the mixed speech signal, first consistency information between the first clean speech signal outputted by the student model and the second clean speech signal outputted by the teacher model, and second consistency information between the first interfering signal outputted by the student model and second interfering signal outputted by the teacher model.

In an exemplary embodiment, the loss function of the iteration is constructed based on the following information:

a short-term time-varying abstract feature outputted by the student model and a short-term time-varying abstract feature outputted by the teacher model; or the short-term time-varying abstract feature outputted by the student model and the short-term time-varying abstract feature outputted by the teacher model, and the short-term time-varying abstract feature outputted by the student model and a long-term stable abstract feature outputted by the teacher model.

When the speech separation apparatus provided in the foregoing embodiment performs speech separation, division of the foregoing functional modules is merely an example for descriptions. During actual application, the foregoing functions may be allocated to and completed by different functional modules according to requirements. That is, the internal structure of the apparatus is divided into different functional modules, to complete all or some of the foregoing described functions. In addition, the speech separation apparatus and speech separation method embodiments provided in the foregoing embodiments belong to the same conception. For the specific implementation process, reference may be made to the method embodiments, and details are not described herein again. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In an exemplary embodiment, the computer device involved in the embodiments of this application includes one or more processors and one or more memories, the one or more memories storing at least one computer program, the at least one computer program being loaded by the one or more processors to perform the following operations:

respectively inputting a mixed speech signal into a student model and a teacher model, the mixed speech signal including a labeled clean speech signal used for generating the mixed speech signal, and a model parameter of the teacher model being configured based on a model parameter of the student model;

determining accuracy information based on a signal outputted by the student model and the labeled clean speech signal in the mixed speech signal, the accuracy information being used for indicating a separation accuracy degree of the student model;

determining consistency information based on the signal outputted by the student model and a signal outputted by the teacher model, the consistency information being used for indicating a consistency degree between separation capabilities of the student model and the teacher model; and adjusting the model parameter of the student model and the model parameter of the teacher model based on a plurality of pieces of accuracy information and a plurality of pieces of consistency information to obtain a speech separation model.

In an exemplary embodiment, the at least one computer program is loaded by the one or more processors to perform any one of the following operations:

determining the accuracy information based on a first clean speech signal outputted by the student model and the labeled clean speech signal in the mixed speech signal;

determining the accuracy information based on a first interfering signal outputted by the student model and an interfering signal other than the clean speech signal in the mixed speech signal; or determining first accuracy information based on the first clean speech signal outputted by the student model and the clean speech signal; determining second accuracy information based on the first interfering signal outputted by the student model and the interfering signal other than the clean speech signal in the mixed speech signal; and determining the accuracy information according to the first accuracy information and the second accuracy information.

In an exemplary embodiment, the at least one computer program is loaded by the one or more processors to perform any one of the following operations:

determining the consistency information based on a first clean speech signal outputted by the student model and a second clean speech signal outputted by the teacher model;

determining the consistency information based on a first interfering signal outputted by the student model and a second interfering signal outputted by the teacher model; or determining first consistency information based on the first clean speech signal outputted by the student model and the second clean speech signal outputted by the teacher model; determining second consistency information based on the first interfering signal outputted by the student model and the second interfering signal outputted by the teacher model; and determining the consistency information according to the first consistency information and the second consistency information.

In an exemplary embodiment, the at least one computer program is loaded by the one or more processors to perform the following operations:

determining the consistency information based on a short-term time-varying abstract feature of the first clean speech signal and a short-term time-varying abstract feature of the second clean speech signal.

In an exemplary embodiment, the at least one computer program is loaded by the one or more processors to perform the following operations:

determining third consistency information based on a short-term time-varying abstract feature of the first clean speech signal and a short-term time-varying abstract feature of the second clean speech signal;

determining fourth consistency information based on the short-term time-varying abstract feature of the first clean speech signal and a long-term stable abstract feature of the second clean speech signal; and determining the consistency information based on a weighted value of the third consistency information and a weighted value of the fourth consistency information.

In an exemplary embodiment, the at least one computer program is loaded by the one or more processors to perform the following operations:

determining the model parameter of the teacher model based on the model parameter of the student model by using an EMA method, and configuring the teacher model by using the determined model parameter of the teacher model.

In an exemplary embodiment, the at least one computer program is loaded by the one or more processors to perform the following operations:

iteratively inputting the mixed speech signal into the student model and the teacher model respectively for a plurality of times to obtain the plurality of pieces of accuracy information and the plurality of pieces of consistency information, one iteration being corresponding to one piece of accuracy information and one piece of consistency information, where the at least one computer program is further loaded by the one or more processors to perform the following operations:

outputting, in response to satisfying a training end condition, the student model determined in an iteration that satisfies the training end condition as the speech separation model.

In an exemplary embodiment, the student model and the teacher model perform signal separation in a PIT manner; or the student model and the teacher model perform signal separation by using a salience-based selection mechanism.

In another exemplary embodiment, the computer device involved in the embodiments of this application includes one or more processors and one or more memories, the one or more memories storing at least one computer program, the at least one computer program being loaded by the one or more processors to perform the following operations:

obtaining a to-be-separated sound signal;

inputting the sound signal into a speech separation model, the speech separation model being obtained based on a mixed speech signal and cooperative iterative training of a student model and a teacher model, and a model parameter of the teacher model being configured based on a model parameter of the student model; and predicting a target speech signal in the sound signal by using the speech separation model, and outputting the target speech signal in the sound signal.

In an exemplary embodiment, a loss function of an iteration is constructed based on accuracy information between an output of the student model and a training input of the student model and consistency information between the output of the student model and an output of the teacher model.

In an exemplary embodiment, the loss function of the iteration is constructed based on the following information:

accuracy information between a first clean speech signal outputted by the student model and a clean speech signal in the mixed speech signal, and consistency information between the first clean speech signal outputted by the student model and a second clean speech signal outputted by the teacher model;

or accuracy information between a first interfering signal outputted by the student model and an interfering signal in the mixed speech signal, and consistency information between the first clean speech signal outputted by the student model and the second clean speech signal outputted by the teacher model;

or first accuracy information between the first clean speech signal outputted by the student model and the clean speech signal in the mixed speech signal, second accuracy information between the first interfering signal outputted by the student model and the interfering signal in the mixed speech signal, first consistency information between the first clean speech signal outputted by the student model and the second clean speech signal outputted by the teacher model, and second consistency information between the first interfering signal outputted by the student model and second interfering signal outputted by the teacher model.

In an exemplary embodiment, the loss function of the iteration is constructed based on the following information:

a short-term time-varying abstract feature outputted by the student model and a short-term time-varying abstract feature outputted by the teacher model; or the short-term time-varying abstract feature outputted by the student model and the short-term time-varying abstract feature outputted by the teacher model, and the short-term time-varying abstract feature outputted by the student model and a long-term stable abstract feature outputted by the teacher model.

Figure 9:
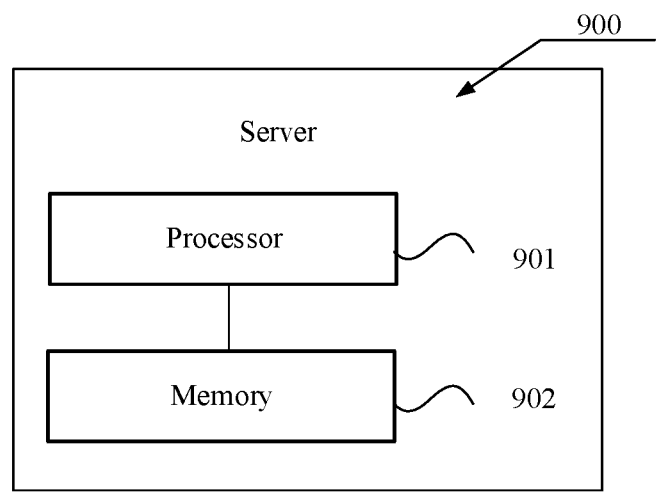
FIG. 9 is a schematic structural diagram of a server according to an embodiment of this application.

The computer device provided in the embodiments of this application may be implemented as a server. FIG. 9 is a schematic structural diagram of a server according to an embodiment of this application. The server 900 may vary greatly because a configuration or performance varies, and may include one or more central processing units (CPU) 901 and one or more memories 902. The one or more memories 902 store at least one computer program, and the at least one computer program is loaded and executed by the one or more processors 901 to implement the speech signal processing method (that is, the speech separation model training method) or the speech separation method provided in the foregoing various embodiments. Certainly, the server 900 may also have a wired or wireless network interface, a keyboard, an input/output interface and other components to facilitate input/output. The server 900 may also include other components for implementing device functions. Details are not described herein.

Figure 10:
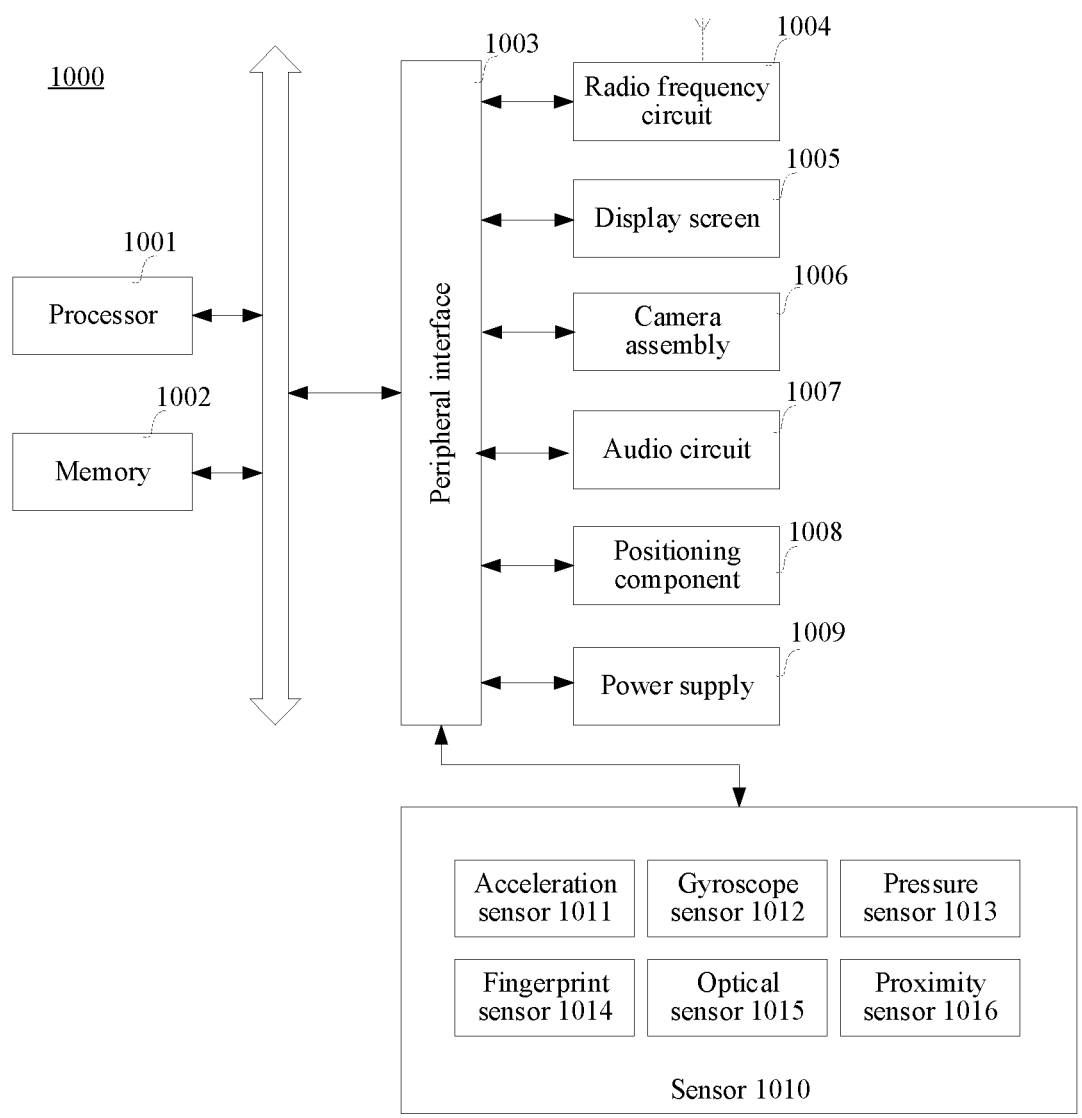
FIG. 10 is a schematic structural diagram of a terminal according to an embodiment of this application.

The computer device provided in the embodiments of this application may be implemented as a terminal. FIG. 10 is a schematic structural diagram of a terminal according to an embodiment of this application. The terminal may be configured to perform the method on a terminal side in the foregoing embodiments. The terminal 1000 may be a smartphone, a smart speech assistant, a smart speaker, a tablet computer, a moving picture experts group audio layer III (MP3) player, a moving picture experts group audio layer IV (MP4) player, a notebook computer, or a desktop computer. The terminal 1000 may also be referred to as user equipment, a portable terminal, a laptop terminal, a desktop terminal, or the like.

Generally, the terminal 1000 includes one or more processors 1001 and one or more memories 1002.

The processor 1001 may include one or more processing cores, for example, a 4-core processor or an 8-core processor. The processor 1001 may be implemented by using at least one hardware form of a digital signal processor (DSP), a field-programmable gate array (FPGA), or a programmable logic array (PLA). The processor 1001 may also include a main processor and a coprocessor. The main processor is a processor configured to process data in an awake state, and is also referred to as a CPU. The coprocessor is a low power consumption processor configured to process data in a standby state. In some embodiments, the processor 1001 may be integrated with a graphics processing unit (GPU). The GPU is configured to render and draw content that needs to be displayed on a display. In some embodiments, the processor 1001 may further include an AI processor. The AI processor is configured to process computing operations related to ML.

The memory 1002 may include one or more computer-readable storage media that may be non-transitory. The memory 1002 may further include a high-speed random access memory and a nonvolatile memory, for example, one or more disk storage devices or flash storage devices. In some embodiments, the non-transitory computer-readable storage medium in the memory 1002 is configured to store at least one instruction, the at least one instruction being configured to be executed by the processor 1001 to perform the speech separation method or the speech separation model training method provided in the method embodiments of this application.

In some embodiments, the terminal 1000 may optionally include a peripheral interface 1003 and at least one peripheral. The processor 1001, the memory 1002, and the peripheral interface 1003 may be connected by using a bus or a signal cable. Each peripheral may be connected to the peripheral interface 1003 by using a bus, a signal cable, or a circuit board. Optionally, the peripheral device includes: at least one of a radio frequency (RF) circuit 1004, a display screen 1005, a camera component 1006, an audio circuit 1007, a positioning component 1008, and a power supply 1009.

The peripheral interface 1003 may be configured to connect at least one input/output (I/O)-related peripheral to the processor 1001 and the memory 1002. In some embodiments, the processor 1001, the memory 1002, and the peripheral interface 1003 are integrated on the same chip or circuit board. In some other embodiments, any one or two of the processor 1001, the memory 1002, and the peripheral interface 1003 may be implemented on a separate chip or circuit board, which is not limited in this embodiment.

The RF circuit 1004 is configured to receive and transmit an RF signal, also referred to as an electromagnetic signal. The RF circuit 1004 communicates with a communication network and another communications device by using the electromagnetic signal. The RF circuit 1004 converts an electrical signal into an electromagnetic signal for transmission, or converts a received electromagnetic signal into an electrical signal. Optionally, the RF circuit 1004 includes: an antenna system, an RF transceiver, one or more amplifiers, a tuner, an oscillator, a digital signal processor, a codec chip set, a subscriber identity module card, and the like. The RF circuit 1004 may communicate with another terminal by using at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the RF circuit 1004 may further include a circuit related to near field communication (NFC), which is not limited in this application.

The display screen 1005 is configured to display a user interface (UI). The UI may include a graph, a text, an icon, a video, and any combination thereof. When the display screen 1005 is a touch display screen, the display screen 1005 is further capable of acquiring touch signals on or above a surface of the display screen 1005. The touch signal may be inputted to the processor 1001 as a control signal for processing. In this case, the display screen 1005 may be further configured to provide a virtual button and/or a virtual keyboard, which is also referred to as a soft button and/or a soft keyboard. In some embodiments, there may be one display screen 1005 disposed on a front panel of the terminal 1000. In some other embodiments, there may be at least two display screens 1005 respectively disposed on different surfaces of the terminal 1000 or designed in a foldable shape. In still some other embodiments, the display screen 1005 may be a flexible display screen disposed on a curved surface or a folded surface of the terminal 1000. Even, the display screen 1005 may be further set in a non-rectangular irregular pattern, namely, a special-shaped screen. The display screen 1005 may be prepared by using materials such as a liquid-crystal display (LCD), an organic light-emitting diode (OLED), or the like.

The camera assembly 1006 is configured to acquire images or videos. Optionally, the camera assembly 1006 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera assembly 1006 may further include a flash. The flash may be a single color temperature flash or a double color temperature flash. The double color temperature flash refers to a combination of a warm light flash and a cold light flash, and may be used for light compensation under different color temperatures.

The audio circuit 1007 may include a microphone and a speaker. The microphone is configured to acquire sound waves of a user and an environment, and convert the sound waves into an electrical signal to input to the processor 1001 for processing, or input to the RF circuit 1004 for implementing speech communication. For the purpose of stereo acquisition or noise reduction, there may be a plurality of microphones, respectively disposed at different portions of the terminal 1000. The microphone may further be an array microphone or an omni-directional acquisition type microphone. The speaker is configured to convert electric signals from the processor 1001 or the RF circuit 1004 into sound waves. The speaker may be a conventional thin-film speaker or a piezoelectric ceramic speaker. When the speaker is the piezoelectric ceramic speaker, the speaker can not only convert electrical signals into sound waves audible to a human being, but also convert electrical signals into sound waves inaudible to the human being for ranging and other purposes. In some embodiments, the audio circuit 1007 may also include an earphone jack.

The positioning component 1008 is configured to position a current geographic position of the terminal 1000, to implement navigation or a location based service (LBS). The positioning component 1008 may be a positioning component based on the global positioning system (GPS) of the United States, the BeiDou Navigation Satellite System (BDS) of China, the GLONASS System of Russia, or the GALILEO System of the European Union.

The power supply 1009 is configured to supply power to components in the terminal 1000. The power supply 1009 may be an alternating-current power supply, a direct-current power supply, a disposable battery, or a rechargeable battery. When the power supply 1009 includes the rechargeable battery, the rechargeable battery may be a wired rechargeable battery or a wireless rechargeable battery. The rechargeable battery may be further configured to support a fast charge technology.

In some embodiments, the terminal 1000 further includes one or more sensors 1010. The one or more sensors 1010 include, but are not limited to: an acceleration sensor 1011, a gyro sensor 1012, a pressure sensor 1013, a fingerprint sensor 1014, an optical sensor 1015, and a proximity sensor 1016.

The acceleration sensor 1011 may detect a magnitude of acceleration on three coordinate axes of a coordinate system established with the terminal 1000. For example, the acceleration sensor 1011 may be configured to detect components of gravity acceleration on the three coordinate axes. The processor 1001 may control, according to a gravity acceleration signal acquired by the acceleration sensor 1011, the display screen 1005 to display the user interface in a frame view or a portrait view. The acceleration sensor 1011 may be further configured to acquire motion data of a game or a user.

The gyroscope sensor 1012 may detect a body direction and a rotation angle of the terminal 1000, and may collect a 3D action of the user on the terminal 1000 together with the acceleration sensor 1011. The processor 1001 may implement the following functions according to the data acquired by the gyroscope sensor 1012: motion sensing (such as changing the UI according to a tilt operation of the user), image stabilization during shooting, game control, and inertial navigation.

The pressure sensor 1013 may be disposed at a side frame of the terminal 1000 and/or a lower layer of the display screen 1005. When the pressure sensor 1013 is disposed at the side frame of the terminal 1000, a holding signal of the user on the terminal 1000 may be detected. The processor 1001 performs left and right hand recognition or a quick operation according to the holding signal acquired by the pressure sensor 1013. When the pressure sensor 1013 is disposed on the low layer of the display screen 1005, the processor 1001 controls, according to a pressure operation of the user on the display screen 1005, an operable control on the UI. The operable control includes at least one of a button control, a scroll-bar control, an icon control, and a menu control.

The fingerprint sensor 1014 is configured to acquire a user's fingerprint, and the processor 1001 identifies a user's identity according to the fingerprint acquired by the fingerprint sensor 1014, or the fingerprint sensor 1014 identifies a user's identity according to the acquired fingerprint. When the identity of the user is identified as a trusted identity, the processor 1001 authorizes the user to perform a related sensitive operation. The sensitive operation includes unlocking a screen, viewing encrypted information, downloading software, payment, changing settings, and the like. The fingerprint sensor 1014 may be disposed on a front face, a back face, or a side face of the terminal 1000. When a physical button or a vendor logo is disposed on the terminal 1000, the fingerprint sensor 1014 may be integrated with the physical button or the vendor logo.

The optical sensor 1015 is configured to acquire ambient light intensity. In an embodiment, the processor 1001 may control display luminance of the display screen 1005 according to the ambient light intensity collected by the optical sensor 1015. Optionally, when the ambient light intensity is relatively high, the display luminance of the display screen 1005 is increased, and when the ambient light intensity is relatively low, the display luminance of the touch display screen 1005 is reduced. In another embodiment, the processor 1001 may further dynamically adjust a camera parameter of the camera assembly 1006 according to the ambient light intensity acquired by the optical sensor 1015.

The proximity sensor 1016, also referred to as a distance sensor, is generally disposed on the front panel of the terminal 1000. The proximity sensor 1016 is configured to acquire a distance between the user and the front surface of the terminal 1000. In an embodiment, when the proximity sensor 1016 detects that the distance between the user and the front surface of the terminal 1000 gradually becomes smaller, the display screen 1005 is controlled by the processor 1001 to switch from a screen-on state to a screen-off state. In a case that the proximity sensor 1016 detects that the distance between the user and the front surface of the terminal 1000 gradually becomes larger, the display screen 1005 is controlled by the processor 1001 to switch from the screen-off state to the screen-on state.

A person skilled in the art may understand that the structure shown in FIG. 10 does not constitute a limitation to the terminal 1000, and the terminal may include more or fewer components than those shown in the figure, or some components may be combined, or a different component deployment may be used.

In an exemplary embodiment, a computer-readable storage medium such as a memory including a computer program is further provided, and the computer program may be executed by a processor to implement the speech separation method or the speech separation model training method in the foregoing embodiments. For example, the computer-readable storage medium may be a read-only memory (ROM), a RAM, a compact disc ROM (CD-ROM), a magnetic tape, a floppy disk, an optical data storage device, or the like.

In an exemplary embodiment, the at least one computer program stored in the computer-readable storage medium is loaded by the processor to perform the following operations:

respectively inputting a mixed speech signal into a student model and a teacher model, the mixed speech signal including a labeled clean speech signal used for generating the mixed speech signal, and a model parameter of the teacher model being configured based on a model parameter of the student model;

determining accuracy information based on a signal outputted by the student model and the labeled clean speech signal in the mixed speech signal, the accuracy information being used for indicating a separation accuracy degree of the student model;

determining consistency information based on the signal outputted by the student model and a signal outputted by the teacher model, the consistency information being used for indicating a consistency degree between separation capabilities of the student model and the teacher model; and adjusting the model parameter of the student model and the model parameter of the teacher model based on a plurality of pieces of accuracy information and a plurality of pieces of consistency information to obtain a speech separation model.

In an exemplary embodiment, the at least one computer program is loaded by the processor to perform any one of the following operations:

determining the accuracy information based on a first clean speech signal outputted by the student model and the labeled clean speech signal in the mixed speech signal;

determining the accuracy information based on a first interfering signal outputted by the student model and an interfering signal other than the clean speech signal in the mixed speech signal; or determining first accuracy information based on the first clean speech signal outputted by the student model and the clean speech signal; determining second accuracy information based on the first interfering signal outputted by the student model and the interfering signal other than the clean speech signal in the mixed speech signal; and determining the accuracy information according to the first accuracy information and the second accuracy information.

In an exemplary embodiment, the at least one computer program is loaded by the processor to perform any one of the following operations:

determining the consistency information based on a first clean speech signal outputted by the student model and a second clean speech signal outputted by the teacher model;

determining the consistency information based on a first interfering signal outputted by the student model and a second interfering signal outputted by the teacher model; or determining first consistency information based on the first clean speech signal outputted by the student model and the second clean speech signal outputted by the teacher model; determining second consistency information based on the first interfering signal outputted by the student model and the second interfering signal outputted by the teacher model; and determining the consistency information according to the first consistency information and the second consistency information.

In an exemplary embodiment, the at least one computer program is loaded by the processor to perform the following operations:

determining the consistency information based on a short-term time-varying abstract feature of the first clean speech signal and a short-term time-varying abstract feature of the second clean speech signal.

In an exemplary embodiment, the at least one computer program is loaded by the processor to perform the following operations:

determining third consistency information based on a short-term time-varying abstract feature of the first clean speech signal and a short-term time-varying abstract feature of the second clean speech signal;

determining fourth consistency information based on the short-term time-varying abstract feature of the first clean speech signal and a long-term stable abstract feature of the second clean speech signal; and determining the consistency information based on a weighted value of the third consistency information and a weighted value of the fourth consistency information.

In an exemplary embodiment, the at least one computer program is loaded by the processor to perform the following operations: determining the model parameter of the teacher model based on the model parameter of the student model by using an EMA method, and configuring the teacher model by using the determined model parameter of the teacher model.

In an exemplary embodiment, the at least one computer program is loaded by the processor to perform the following operations:

iteratively inputting the mixed speech signal into the student model and the teacher model respectively for a plurality of times to obtain the plurality of pieces of accuracy information and the plurality of pieces of consistency information, one iteration being corresponding to one piece of accuracy information and one piece of consistency information, where In an exemplary embodiment, the at least one computer program is further loaded by the processor to perform the following operations:

outputting, in response to satisfying a training end condition, the student model determined in an iteration that satisfies the training end condition as the speech separation model.

In an exemplary embodiment, the student model and the teacher model perform signal separation in a PIT manner; or the student model and the teacher model perform signal separation by using a salience-based selection mechanism.

In another exemplary embodiment, the at least one computer program stored in the computer-readable storage medium is loaded by the processor to perform the following operations:

obtaining a to-be-separated sound signal;

inputting the sound signal into a speech separation model, the speech separation model being obtained based on a mixed speech signal and cooperative iterative training of a student model and a teacher model, and a model parameter of the teacher model being configured based on a model parameter of the student model; and predicting a target speech signal in the sound signal by using the speech separation model, and outputting the target speech signal in the sound signal.

In an exemplary embodiment, a loss function of an iteration is constructed based on accuracy information between an output of the student model and a training input of the student model and consistency information between the output of the student model and an output of the teacher model.

In an exemplary embodiment, the loss function of the iteration is constructed based on the following information:

accuracy information between a first clean speech signal outputted by the student model and a clean speech signal in the mixed speech signal, and consistency information between the first clean speech signal outputted by the student model and a second clean speech signal outputted by the teacher model;

or accuracy information between a first interfering signal outputted by the student model and an interfering signal in the mixed speech signal, and consistency information between the first clean speech signal outputted by the student model and the second clean speech signal outputted by the teacher model;

or first accuracy information between the first clean speech signal outputted by the student model and the clean speech signal in the mixed speech signal, second accuracy information between the first interfering signal outputted by the student model and the interfering signal in the mixed speech signal, first consistency information between the first clean speech signal outputted by the student model and the second clean speech signal outputted by the teacher model, and second consistency information between the first interfering signal outputted by the student model and second interfering signal outputted by the teacher model.

In an exemplary embodiment, the loss function of the iteration is constructed based on the following information:

a short-term time-varying abstract feature outputted by the student model and a short-term time-varying abstract feature outputted by the teacher model; or the short-term time-varying abstract feature outputted by the student model and the short-term time-varying abstract feature outputted by the teacher model, and the short-term time-varying abstract feature outputted by the student model and a long-term stable abstract feature outputted by the teacher model.

Exemplarily, the embodiments of this application further provide a computer program product or a computer program, the computer program product or the computer program including one or more pieces of program code, the one or more pieces of program code being stored in a computer-readable storage medium. One or more processors of a computer device can read the one or more pieces of program code from the computer-readable storage medium, and the one or more processors execute the one or more pieces of program code to enable the computer device to perform the speech signal processing method or the speech separation method involved in the foregoing embodiments.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A speech signal processing method performed by a computer device, the method comprising:
respectively inputting a mixed speech signal into a student model and a teacher model, the mixed speech signal including a labeled clean speech signal used for generating the mixed speech signal, and a model parameter of the teacher model being configured based on a model parameter of the student model;
determining accuracy information based on a signal outputted by the student model and the labeled clean speech signal in the mixed speech signal, the accuracy information being used for indicating a separation accuracy degree of the student model;
determining consistency information based on the signal outputted by the student model and a signal outputted by the teacher model, the consistency information being used for indicating a consistency degree between separation capabilities of the student model and the teacher model, the determining consistency information further including:
determining first consistency information based on a first clean speech signal outputted by the student model and a second clean speech signal outputted by the teacher model;
determining second consistency information based on a first interfering signal outputted by the student model and a second interfering signal outputted by the teacher model; and
determining the consistency information according to the first consistency information and the second consistency information; and
adjusting the model parameter of the student model and the model parameter of the teacher model based on a plurality of pieces of the accuracy information and a plurality of pieces of the consistency information to obtain a speech separation model.

2. The method according to claim 1, wherein the determining accuracy information based on a signal outputted by the student model and the labeled clean speech signal in the mixed speech signal comprises:
determining first accuracy information based on the first clean speech signal outputted by the student model and the labeled clean speech signal in the mixed speech signal;
determining second accuracy information based on the first interfering signal outputted by the student model and an interfering signal other than the labeled clean speech signal in the mixed speech signal; and
determining the accuracy information according to the first accuracy information and the second accuracy information.

3. The method according to claim 1, wherein the determining first consistency information based on a first clean speech signal outputted by the student model and a second clean speech signal outputted by the teacher model comprises:
determining the first consistency information based on a short-term time-varying abstract feature of the first clean speech signal and a short-term time-varying abstract feature of the second clean speech signal.

4. The method according to claim 1, wherein the determining first consistency information based on a first clean speech signal outputted by the student model and a second clean speech signal outputted by the teacher model comprises:
determining third consistency information based on a short-term time-varying abstract feature of the first clean speech signal and a short-term time-varying abstract feature of the second clean speech signal;
determining fourth consistency information based on the short-term time-varying abstract feature of the first clean speech signal and a long-term stable abstract feature of the second clean speech signal; and
determining the first consistency information based on a weighted value of the third consistency information and a weighted value of the fourth consistency information.

5. The method according to claim 1, wherein the adjusting the model parameter of the student model and the model parameter of the teacher model comprises:
determining the model parameter of the teacher model based on the model parameter of the student model by using an exponential moving average (EMA) method and
configuring the teacher model by using the determined model parameter of the teacher model.

6. The method according to claim 1, wherein the adjusting the model parameter of the student model and the model parameter of the teacher model based on a plurality of pieces of the accuracy information and a plurality of pieces of the consistency information to obtain a speech separation model comprises:
iteratively inputting the mixed speech signal into the student model and the teacher model respectively for a plurality of iterations to obtain the plurality of pieces of the accuracy information and the plurality of pieces of the consistency information, each iteration of the plurality of iterations corresponding to one respective piece of accuracy information and one respective piece of consistency information and updating the model parameter of the student model and the model parameter of the teacher model based on the plurality of pieces of the accuracy information and the plurality of pieces of the consistency information; and
outputting the updated student model when the updated student model satisfies a training end condition as the speech separation model.

7. The method according to claim 6, wherein a loss function of the each an iteration of the plurality of iterations is constructed based on accuracy information between an output of the student model and a training input of the student model and consistency information between the output of the student model and an output of the teacher model.

8. The method according to claim 7, wherein the loss function of the iteration is constructed based on the following information:
a short-term time-varying abstract feature outputted by the student model and a short-term time-varying abstract feature outputted by the teacher model; or
the short-term time-varying abstract feature outputted by the student model, the short-term time-varying abstract feature outputted by the teacher model, and a long-term stable abstract feature outputted by the teacher model.

9. The method according to claim 1, wherein the student model and the teacher model perform signal separation in a permutation invariant training (PIT) manner; or the student model and the teacher model perform signal separation by using a salience-based selection mechanism.

10. The method according to claim 1, further comprising:
obtaining a sound signal;
inputting the sound signal into the speech separation model; and
predicting a target speech signal in the sound signal by using the speech separation model, and outputting the target speech signal in the sound signal.

11. A computer device, comprising one or more processors and one or more memories storing at least one computer program, the at least one computer program being executed by the one or more processors and causing the computer device to perform a speech signal processing method including:
respectively inputting a mixed speech signal into a student model and a teacher model, the mixed speech signal including a labeled clean speech signal used for generating the mixed speech signal, and a model parameter of the teacher model being configured based on a model parameter of the student model;
determining accuracy information based on a signal outputted by the student model and the labeled clean speech signal in the mixed speech signal, the accuracy information being used for indicating a separation accuracy degree of the student model;
determining consistency information based on the signal outputted by the student model and a signal outputted by the teacher model, the consistency information being used for indicating a consistency degree between separation capabilities of the student model and the teacher model, the determining consistency information further including:
determining first consistency information based on a first clean speech signal outputted by the student model and a second clean speech signal outputted by the teacher model;
determining second consistency information based on a first interfering signal outputted by the student model and a second interfering signal outputted by the teacher model; and
determining the consistency information according to the first consistency information and the second consistency information; and
adjusting the model parameter of the student model and the model parameter of the teacher model based on a plurality of pieces of the accuracy information and a plurality of pieces of the consistency information to obtain a speech separation model.

12. The computer device according to claim 11, wherein the determining accuracy information based on a signal outputted by the student model and the labeled clean speech signal in the mixed speech signal comprises:
determining first accuracy information based on the first clean speech signal outputted by the student model and the labeled clean speech signal in the mixed speech signal;
determining second accuracy information based on the first interfering signal outputted by the student model and an interfering signal other than the labeled clean speech signal in the mixed speech signal; and
determining the accuracy information according to the first accuracy information and the second accuracy information.

13. The computer device according to claim 11, wherein the student model and the teacher model perform signal separation in a permutation invariant training (PIT) manner; or the student model and the teacher model perform signal separation by using a salience-based selection mechanism.

14. The computer device according to claim 11, wherein the determining first consistency information based on a first clean speech signal outputted by the student model and a second clean speech signal outputted by the teacher model comprises:
determining the first consistency information based on a short-term time-varying abstract feature of the first clean speech signal and a short-term time-varying abstract feature of the second clean speech signal.

15. The computer device according to claim 11, wherein the adjusting the model parameter of the student model and the model parameter of the teacher model comprises:
determining the model parameter of the teacher model based on the model parameter of the student model by using an exponential moving average (EMA) method and
configuring the teacher model by using the determined model parameter of the teacher model.

16. The computer device according to claim 11, wherein the adjusting the model parameter of the student model and the model parameter of the teacher model based on a plurality of pieces of the accuracy information and a plurality of pieces of the consistency information to obtain a speech separation model comprises:
iteratively inputting the mixed speech signal into the student model and the teacher model respectively for a plurality of iterations to obtain the plurality of pieces of the accuracy information and the plurality of pieces of the consistency information, each iteration of the plurality of iterations corresponding to one respective piece of accuracy information and one respective piece of consistency information and updating the model parameter of the student model and the model parameter of the teacher model based on the plurality of pieces of the accuracy information and the plurality of pieces of the consistency information; and
outputting the updated student model when the updated student model satisfies a training end condition as the speech separation model.

17. The computer device according to claim 16, wherein a loss function of the each iteration of the plurality of iterations is constructed based on accuracy information between an output of the student model and a training input of the student model and consistency information between the output of the student model and an output of the teacher model.

18. A non-transitory computer-readable storage medium, storing at least one computer program, the at least one computer program being executed by one or more processors of a computer device and causing the computer device to perform a speech signal processing method including:
respectively inputting a mixed speech signal into a student model and a teacher model, the mixed speech signal including a labeled clean speech signal used for generating the mixed speech signal, and a model parameter of the teacher model being configured based on a model parameter of the student model;
determining accuracy information based on a signal outputted by the student model and the labeled clean speech signal in the mixed speech signal, the accuracy information being used for indicating a separation accuracy degree of the student model;

determining consistency information based on the signal outputted by the student model and a signal outputted by the teacher model, the consistency information being used for indicating a consistency degree between separation capabilities of the student model and the teacher model, the determining consistency information further including:
  determining first consistency information based on a first clean speech signal outputted by the student model and a second clean speech signal outputted by the teacher model;
  determining second consistency information based on a first interfering signal outputted by the student model and a second interfering signal outputted by the teacher model; and
determining the consistency information according to the first consistency information and the second consistency information; and
adjusting the model parameter of the student model and the model parameter of the teacher model based on a plurality of pieces of the accuracy information and a plurality of pieces of the consistency information to obtain a speech separation model.

\* \* \* \* \*